United States Patent
Freeborn et al.

(10) Patent No.: US 6,941,600 B2
(45) Date of Patent: Sep. 13, 2005

(54) ADJUSTABLE BED CARRIAGE

(75) Inventors: Brian Freeborn, Mississauga (CA); Ted House, Grimsby (CA); Geoff Rutherford, Milton (CA)

(73) Assignee: M.C. Healthcare Products Inc., Beamsville (CA)

( * ) Notice: Subject to any disclaimer, the term of this patent is extended or adjusted under 35 U.S.C. 154(b) by 0 days.

(21) Appl. No.: 10/692,675

(22) Filed: Oct. 27, 2003

(65) Prior Publication Data

US 2004/0128766 A1 Jul. 8, 2004

Related U.S. Application Data

(60) Provisional application No. 60/421,077, filed on Oct. 25, 2002.

(51) Int. Cl.$^7$ .................................................. A47B 7/00
(52) U.S. Cl. ...................... 5/611; 5/86.1; 5/11; 15/35 R
(58) Field of Search .............................. 5/11, 611, 86.1; 16/35 R; 296/20; 254/2 C, 7 C

(56) References Cited

U.S. PATENT DOCUMENTS

| | | | | |
|---|---|---|---|---|
| 2,110,227 A | * | 3/1938 | Koenigkramer et al. .... | 188/2 R |
| 2,833,587 A | * | 5/1958 | Baird .......................... | 296/20 |
| 3,113,770 A | * | 12/1963 | Rutledge ...................... | 5/610 |
| 3,431,584 A | * | 3/1969 | Maslow ....................... | 16/35 R |
| 3,462,772 A | | 8/1969 | Morrison | |
| 3,472,183 A | * | 10/1969 | Goodman ................... | 108/147 |
| 3,644,945 A | | 2/1972 | Goodman et al. | |
| 3,700,070 A | | 10/1972 | King | |
| 4,023,849 A | | 5/1977 | Bethlen | |
| 4,097,939 A | | 7/1978 | Peck et al. | |
| 4,258,445 A | | 3/1981 | Zur | |
| 4,381,571 A | | 5/1983 | Elliott | |
| 4,425,673 A | | 1/1984 | Werner | |
| 4,437,635 A | | 3/1984 | Pham | |
| 4,523,732 A | | 6/1985 | Biber et al. | |
| 4,793,445 A | | 12/1988 | Collignon et al. | |
| 4,927,127 A | | 5/1990 | Lock | |
| 5,084,922 A | | 2/1992 | Louit | |
| 5,095,562 A | | 3/1992 | Alexander | |
| 5,245,718 A | | 9/1993 | Krauska | |
| RE34,433 E | * | 11/1993 | Heiligenthal et al. ....... | 16/35 R |
| 5,257,428 A | | 11/1993 | Carroll et al. | |
| 5,285,992 A | | 2/1994 | Brown | |
| 5,347,682 A | | 9/1994 | Edgerton, Jr. | |
| 5,435,027 A | * | 7/1995 | Bourgraf et al. ............... | 5/611 |
| RE35,201 E | | 4/1996 | Krauska | |
| 5,604,942 A | | 2/1997 | Allevato et al. | |
| 5,611,094 A | | 3/1997 | D'Entremont | |
| 5,613,255 A | | 3/1997 | Bish et al. | |
| 5,630,238 A | | 5/1997 | Weismiller et al. | |
| 5,636,394 A | | 6/1997 | Bartley | |
| 5,682,631 A | | 11/1997 | Weismiller et al. | |
| 5,685,035 A | | 11/1997 | Urness et al. | |
| 5,708,997 A | | 1/1998 | Foster et al. | |
| 5,720,059 A | | 2/1998 | Allevato et al. | |
| 5,774,914 A | | 7/1998 | Johnson et al. | |
| 6,006,379 A | | 12/1999 | Hensley | |
| 6,076,209 A | | 6/2000 | Paul | |
| 6,230,344 B1 | | 5/2001 | Thompson et al. | |
| 6,264,006 B1 | * | 7/2001 | Hanson et al. ............. | 188/1.12 |
| 6,321,878 B1 | | 11/2001 | Mobley et al. | |
| 6,405,393 B2 | * | 6/2002 | Megown ........................ | 5/611 |

(Continued)

Primary Examiner—Michael Trettel

(57) ABSTRACT

An adjustable bed carriage for supporting a main bed frame above a substantially planar floor. The adjustable bed carriage has a first leg with an upper end slidably attached to a first end of the main bed frame and a second leg with an upper end pivotably attached to a second end of the main bed frame. Each of the first leg and the second leg are pivotably connected to each other at a central pivot located substantially at a midpoint of each, to permit pivoting movement of each of the first leg and the second leg about the central pivot in opposite directions. The pivoting movement of the legs moves the adjustable bed carriage between a fully extended condition and a fully collapsed condition.

16 Claims, 26 Drawing Sheets

U.S. PATENT DOCUMENTS 6,473,921 B2  11/2002  Brooke et al.
6,546,577 B1  4/2003  Chinn
6,601,251 B2 *  8/2003  Paul .............................. 5/611
2003/0033672 A1  2/2003  Jehn

* cited by examiner

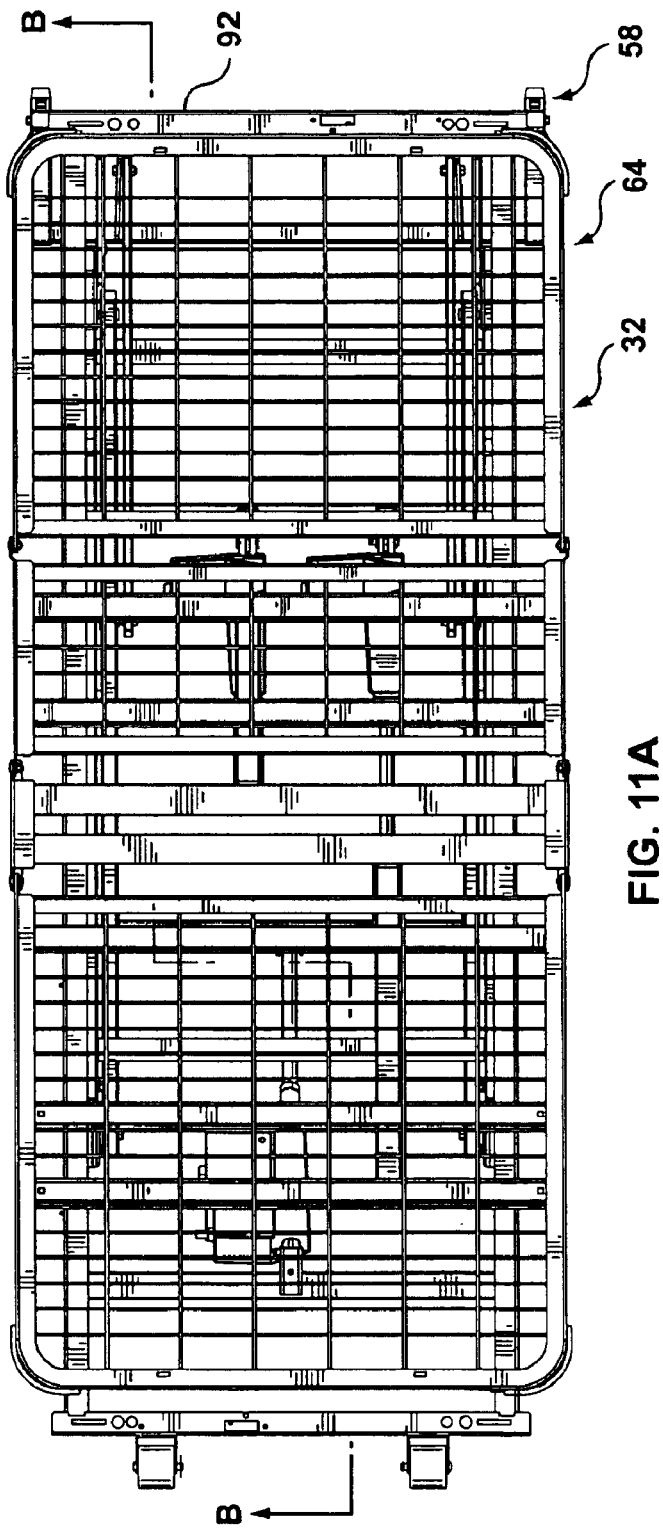
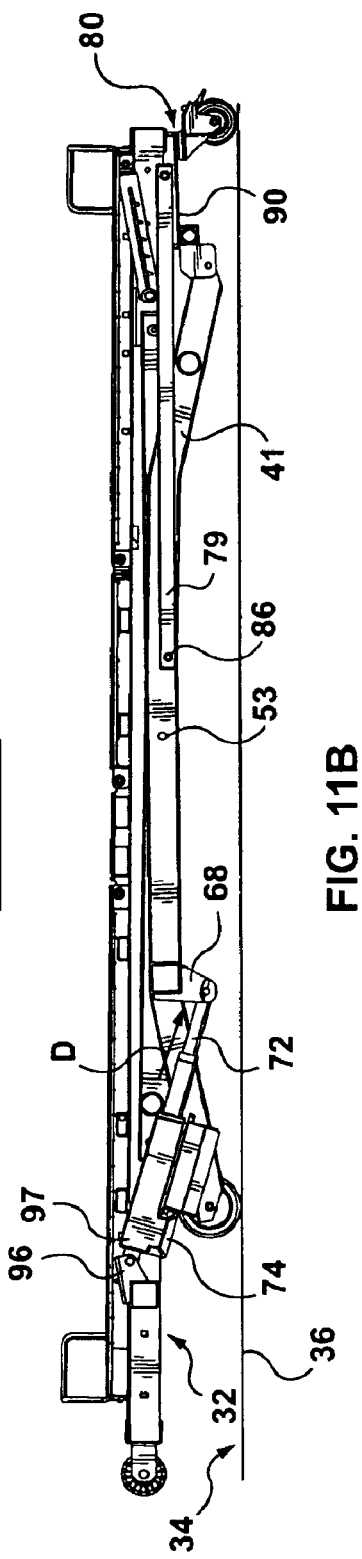
FIG. 11A
FIG. 11B

ADJUSTABLE BED CARRIAGE

This application claims the benefit of U.S. Provisional Application No. 60/421,077, filed Oct. 25, 2002.

FIELD OF THE INVENTION

This invention relates to an adjustable bed carriage for supporting a main bed frame.

BACKGROUND OF THE INVENTION

Known adjustable bed carriages are generally of three types. One type of adjustable bed carriage includes leg assemblies which are positioned at both ends of a main bed frame. An example of this type of known adjustable bed carriage is disclosed in U.S. Pat. No. 4,023,849 (Bethlen).

A second general type includes extendable linkages at both ends of the main bed frame. For instance, such an adjustable bed carriage is disclosed in U.S. Pat. No. 4,097,939 (Peck et al.).

The other well-known type of adjustable bed carriage includes a base supported by casters, wheels or feet on which legs (or linkages), are positioned, extending upwardly to the main bed frame. U.S. Pat. No. 3,462,772 (Morrison) discloses an example of this general type of known adjustable bed carriage.

Scissor leg assemblies are also known and can provide relative simplicity and generally greater overall strength and stability. However, scissor leg assemblies have not generally been used in adjustable bed carriages, and those that have suffer from some deficiencies. For example, in U.S. Pat. No. 5,613,255 (Bish et al.), an adjustable bed carriage is disclosed in which two scissor leg assemblies support the main bed frame. However, the Bish et al. adjustable bed carriage is relatively complex, involving a relatively large number of components. In particular, the two scissor leg assemblies are shown (in FIGS. 4 and 5 of Bish et al.) to include a number of slidable connections between the scissor leg assemblies and a base and a main bed frame. Such slidable connections should be minimized in order to reduce manufacturing costs.

There is therefore a need for an improved adjustable bed carriage for supporting a main bed frame.

SUMMARY OF THE INVENTION

In a broad aspect, the invention provides an adjustable bed carriage for supporting a main bed frame above a substantially planar floor. The adjustable bed carriage has a first leg with an upper end slidably attached to a first end of the main bed frame and a second leg with an upper end pivotably attached to a second end of the main bed frame. Each of the first leg and the second leg are pivotably connected to each other at a central pivot located substantially at a midpoint of each, to permit pivoting movement of each of the first leg and the second leg about the central pivot in opposite directions. The pivoting movement of the legs moves the adjustable bed carriage between a fully extended condition and a fully collapsed condition.

In another aspect, the invention provides an adjustable bed for use on a substantially planar floor. The adjustable bed includes a main bed frame, having a first end and a second end, and an adjustable bed carriage for supporting the main bed frame. The adjustable bed carriage has a first leg having an upper end slidably attached to the first end of the main bed frame and a second leg having an upper end pivotably attached to the second end of the main bed frame. Each of the first leg and the second leg are pivotably connected to each other at a central pivot located substantially at a midpoint of each leg to permit pivoting movement of each of the first leg and the second leg about the central pivot in the opposite directions. The pivoting movement of the legs moves the adjustable bed carriage between an extended condition and a retracted condition, moving the main bed frame relative to the plane of the floor.

In another aspect, the first leg includes a first leg base mounted on a lower end of the first leg for engaging the floor, and the second leg includes a second leg base mounted on a lower end of the second leg for engaging the floor.

In yet another aspect, the invention includes a motor mounted on the main bed frame and coupled to the adjustable bed carriage. The motor is adapted b act upon the adjustable bed carriage to move the adjustable bed carriage between the extended condition and the retracted condition.

In yet another aspect, the invention provides an adjustable bed for use on a substantially planar floor. The adjustable bed has a main frame for supporting a mattress, the main frame having a first end and a second end, a scissor leg assembly for supporting the main frame, and a motor mounted on the main frame and attached to the scissor leg assembly, for causing the scissor leg assembly to move between an extended condition, in which the main frame is in a fully raised position, and a retracted condition, in which the main frame is in a fully lowered position.

The scissor leg assembly includes a first pair of legs having a proximal end slidably attached to the main frame at the first end and a second pair of legs having a proximal end pivotably attached to the main frame at the second end. The first pair of legs includes one or more casters for engaging the floor and positioned in a caster base mounted at a distal end thereof positioned distal to the first end of the main frame. The caster base is disposed in a preselected position relative to the plane of the floor when the scissor leg assembly is in the extended condition. The second pair of legs has one or more wheels for engaging the floor and mounted at a distal end thereof positioned distal to the second end of the main frame. The first and second pairs of legs are pivotably connected to each other at substantially coplanar central pivot points disposed substantially midway between the proximal ends and the distal ends of each said pairs of legs respectively, so that the scissor leg assembly is movable between the extended condition and the retracted condition. The scissor leg assembly also includes one or more follower struts, each with an upper end and a lower end. The lower end of each follower strut is pivotably attached to the caster base. The upper end of each follower strut is pivotably attached to the second pair of legs at a predetermined pivot point located between the central pivot point and the proximal end of the second pair of legs. The predetermined pivot point is selected so that each follower strut maintains the caster base substantially in the preselected position relative to the plane of the floor as the scissor leg assembly moves between the extended condition and the retracted condition.

BRIEF DESCRIPTION OF THE DRAWINGS

The invention will be better understood with reference to the drawings, in which:

FIG. 11A is a top view of the adjustable bed carriage of FIG. 1 in the retracted condition and the main bed frame, drawn at a larger scale;

FIG. 11B is a section view of the adjustable bed carriage of FIG. 11A and the main bed frame taken along line B—B in FIG. 11A;

DETAILED DESCRIPTION OF THE PREFERRED EMBODIMENT(S)

Figure 1:
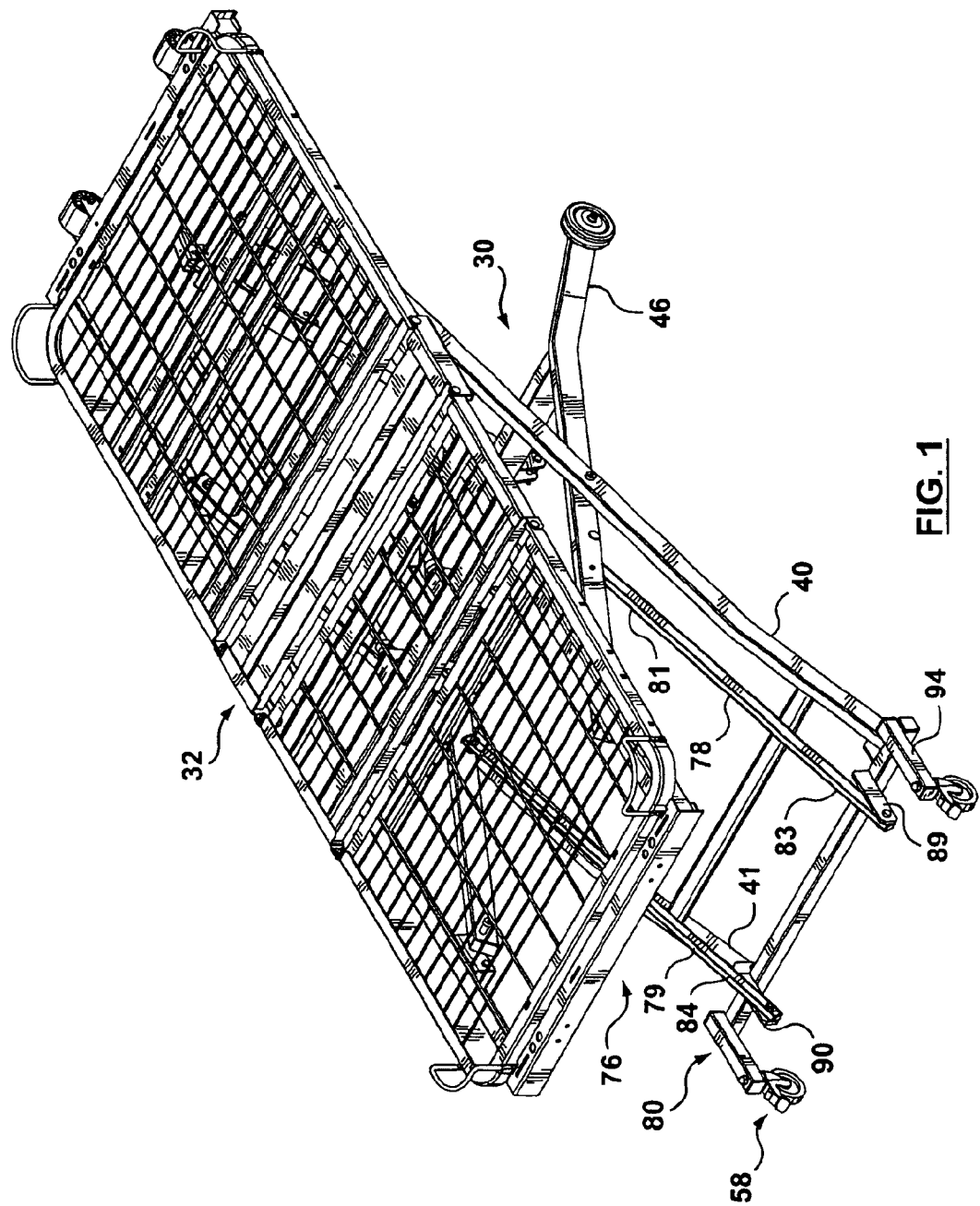
FIG. 1 is an isometric view of a preferred embodiment of an adjustable bed carriage as well as a main bed frame positioned thereon, the adjustable bed carriage being shown in an extended condition.
Figure 2:
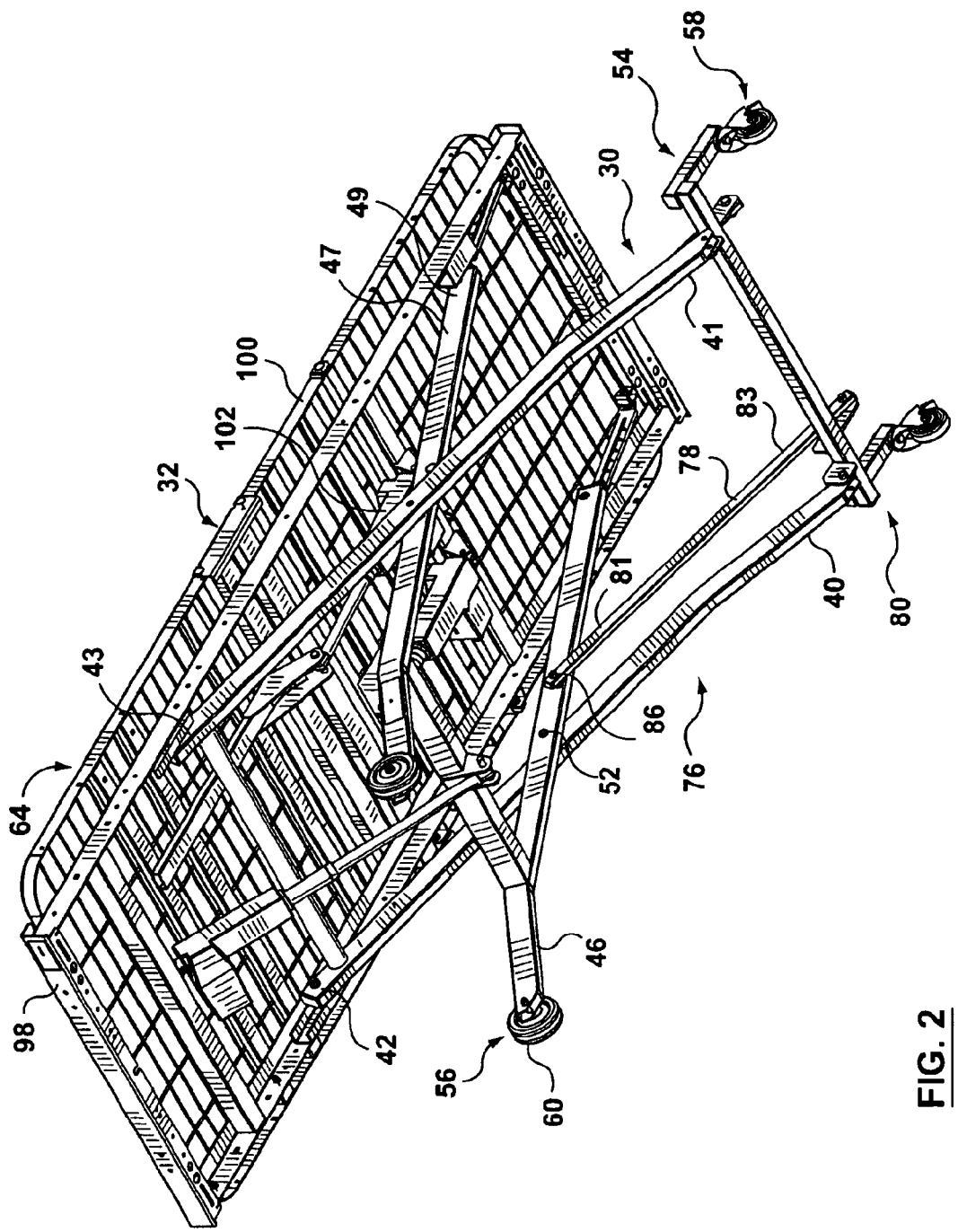
FIG. 2 is an isometric view of the back and bottom of the adjustable bed carriage of FIG. 1 and of the main bed frame.
Figure 5:
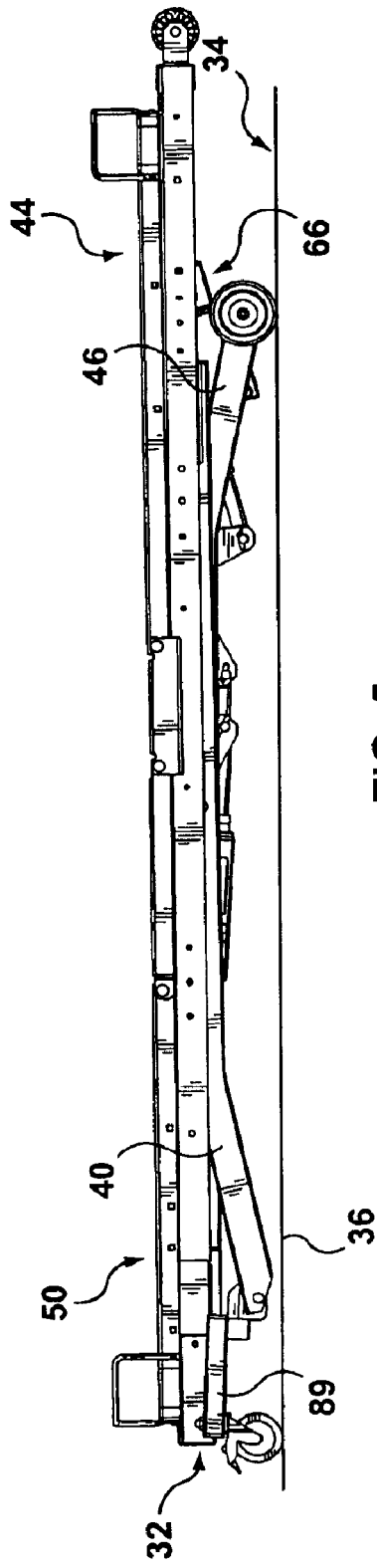
FIG. 5 is a side view of the right side of the adjustable bed carriage of FIG. 1 with the main bed frame positioned thereon, and showing the adjustable bed carriage in a retracted condition.
Figure 6:
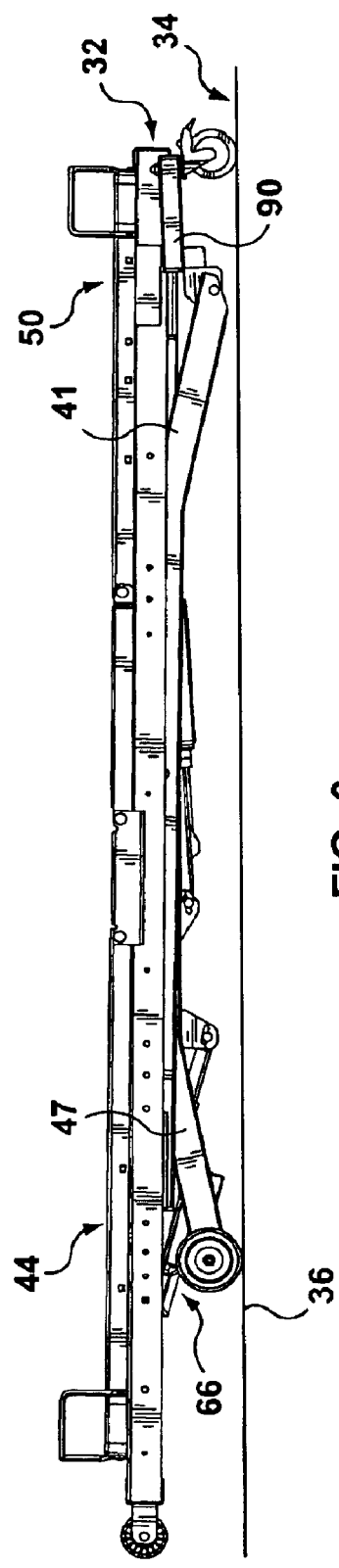
FIG. 6 is a side view of the left side of the adjustable bed carriage of FIG. 1 and of the main bed frame in the retracted condition.
Figure 7:
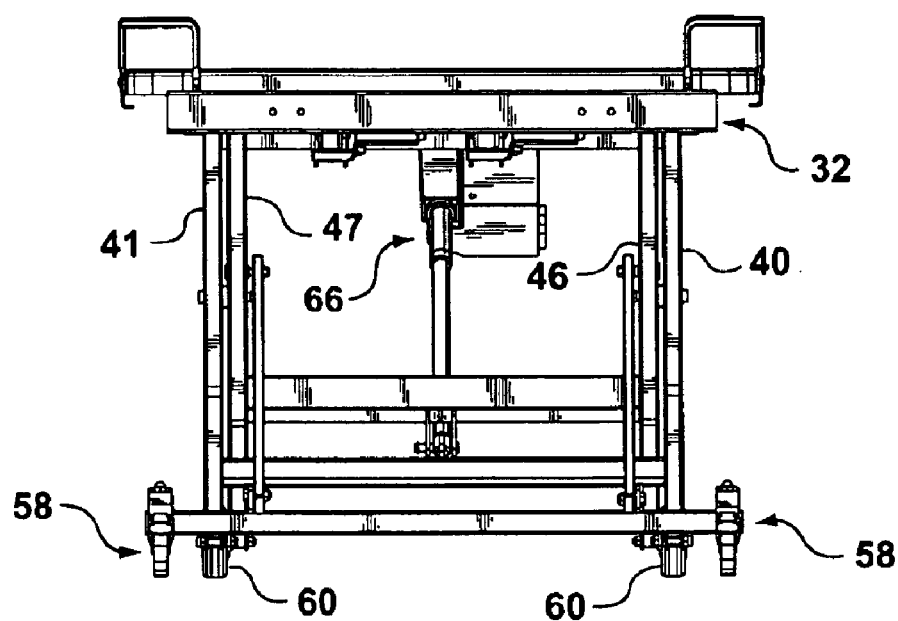
FIG. 7 is a side view of the front side of the adjustable bed carriage of FIG. 1 in the extended condition and of the main bed frame.
Figure 8:
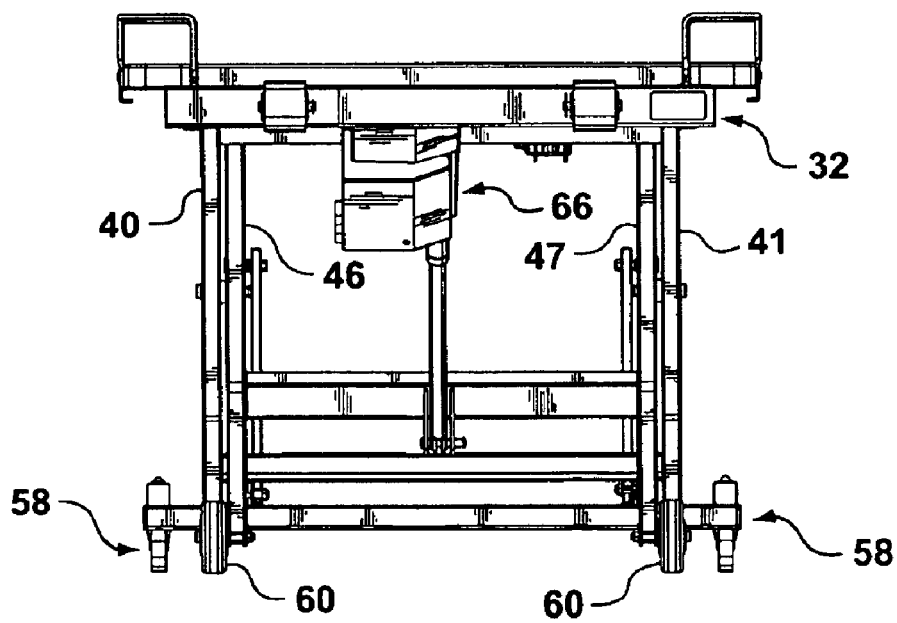
FIG. 8 is a side view of the rear side of the adjustable bed carriage of FIG. 1 in the extended condition and of the main bed frame.

Reference is first made to FIGS. 1–8, 9A, 9B and 10 to describe a preferred embodiment of an adjustable bed carriage indicated generally by the numeral 30 in accordance with the invention. The adjustable bed carriage 30 is for supporting a main bed frame 32 above a substantially planar floor 34. In the preferred embodiment, the adjustable bed carriage 30 has first legs 40, 41 with upper ends 42, 43 respectively. Each upper end 42, 43 is slidably attached to a first end 44 of the main bed frame 32, as will be described. As can be seen in FIGS. 1 and 2, the adjustable bed carriage 30 also includes second legs 46, 47 with upper ends 48, 49 respectively, and each upper end 48, 49 is pivotably attached at a second end 50 of the main bed frame 32. In addition, each of the first legs 40, 41 and the second legs, 46, 47 are pivotably connected respectively at central pivots 52, 53 located substantially at the midpoints of the legs 40, 41 and 46, 47. The connections of the legs 40, 41 and 46, 47 at the central pivots 52, 53 permits pivoting movement of the legs 40, 41 and 46, 47 respectively about the central pivots 52, 53 in opposite directions, as will be described. The pivoting movement of the legs 40, 41 and 46, 47 about the central pivots 52, 53 respectively moves the adjustable bed carriage 30 between an extended condition (FIGS. 1–4, 7, 8, 9A, 9B and 10) and a retracted condition (FIGS. 5, 6).

Figure 3:
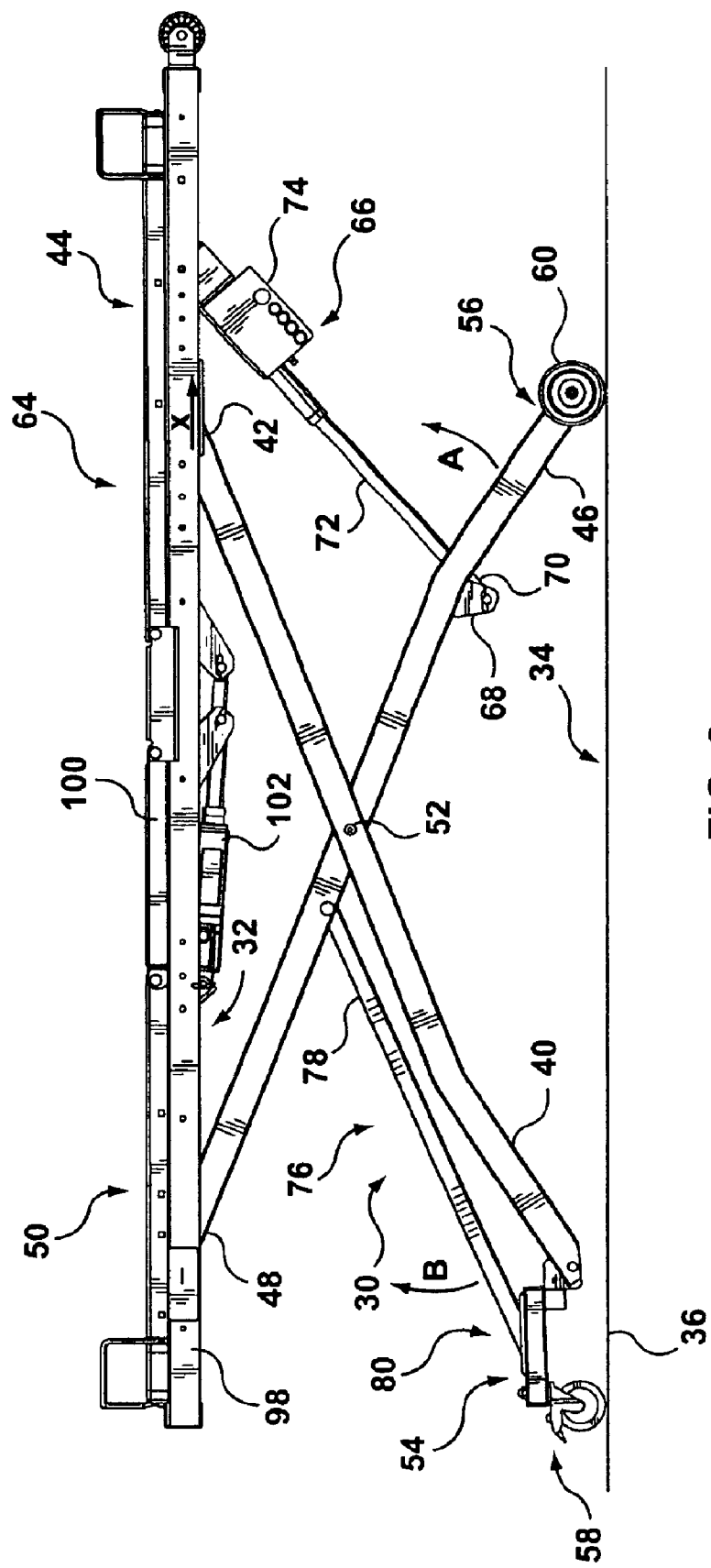
FIG. 3 is a side view of a right side of the adjustable bed carriage of FIG. 1 and of the main bed frame.
Figure 4:
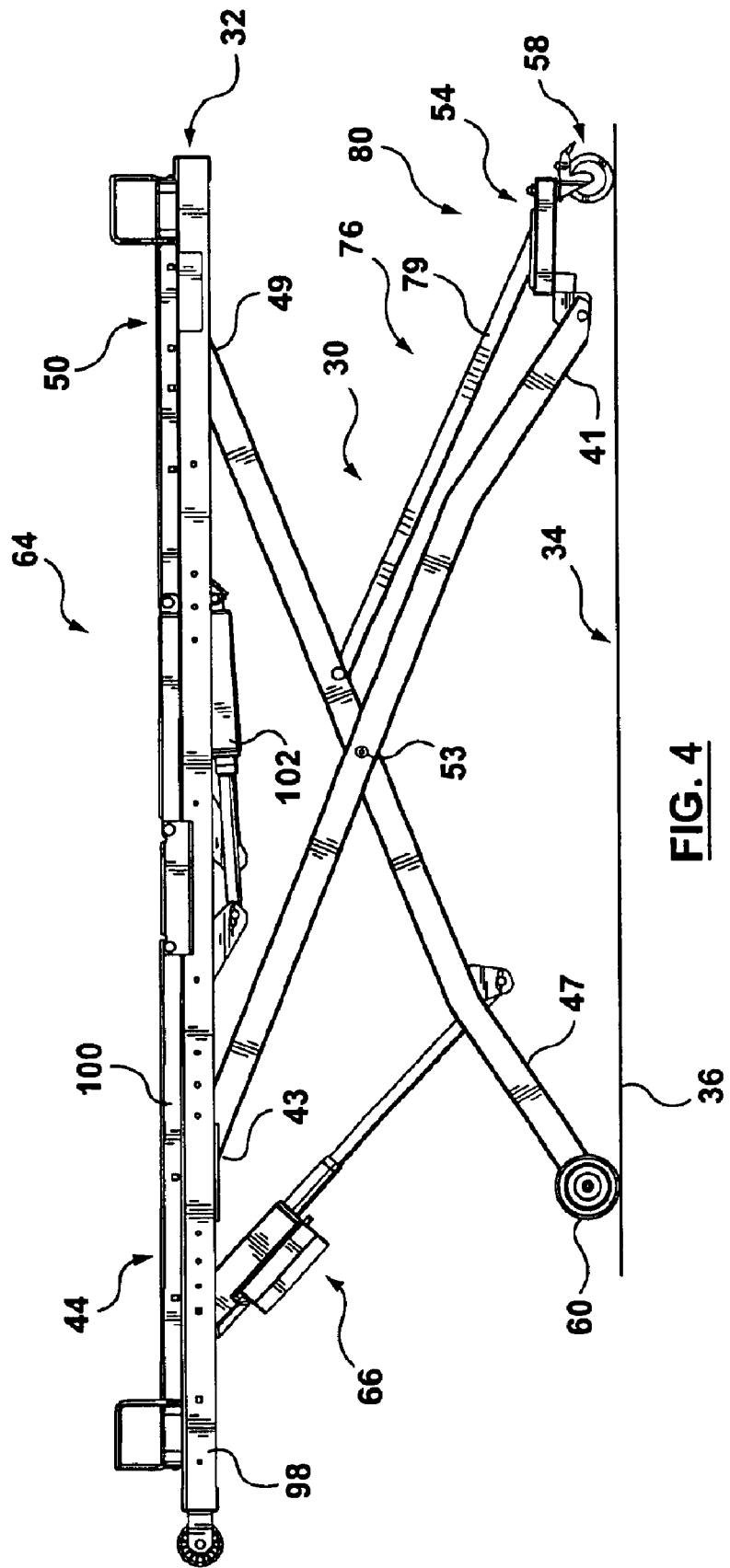
FIG. 4 is a side view of a left side of the adjustable bed carriage of FIG. 1 and of the main bed frame.

In the preferred embodiment, pivoting movement of the legs 46, 47 results in a corresponding pivoting movement of the legs 40, 41 to move the adjustable bed carriage between the extended condition and the retracted condition, so that the main bed frame 32 is thereby moved between a fully raised position (FIGS. 1–4, 7, 8) in which the adjustable bed carriage 30 is in the extended condition and a fully lowered position (FIGS. 5, 6), in which the adjustable bed carriage 30 is in the retracted condition. For example, as shown in FIG. 3, pivoting movement of the leg 46 in the direction indicated by arrow "A" would result in pivoting movement of the leg 40 in the direction of arrow "B". Also, the pivoting movement of the second leg 46 results in sliding movement of the upper end of the first leg 40 in the direction of arrow "X" in FIG. 3.

As can be seen in FIGS. 1–8, the first legs 40, 41 preferably include a first leg base 54, and the second legs 46, 47 preferably include one or more second leg bases 56. In the preferred embodiment, the first leg base 54 includes one or more casters 58, and the second leg base 56 includes one or more wheels 60. It will be appreciated by those skilled in the art, however, that various devices may be included in the first leg base 54 and the second leg base 56 for engaging the floor 34. For example, each of the first leg base 54 and the second leg base 56 may include one or more casters, one or more wheels, or one or more feet for engaging the floor 34.

A preferred embodiment of an adjustable bed 64 of the invention includes the main bed frame 32 and the adjustable bed carriage 30 for supporting the main bed frame 32 on a substantially planar floor 34. Preferably, the adjustable bed 64 includes a motor 66 mounted on the main bed frame 32 and coupled to the adjustable bed carriage 30, for positioning the adjustable bed carriage 30. Although various types of motors could be used, the preferred motor 66 is a linear screw drive motor powered by electricity, as is known in the art. As shown in FIG. 9B, the motor 66 is preferably pivotably mounted on the main bed frame 32 and pivotably mounted on the second leg 46. In the preferred embodiment, the second legs 46, 47 each include a downwardly depending flange 68 in which a distal end 70 of the motor 66 is mounted, as will be described. When the adjustable bed carriage 30 is to be moved from the extended condition (FIG. 9B) (or from an intermediate position) to or towards the retracted condition, a movable portion 72 is retracted into a motor body 74 in a controlled manner, in the direction shown by arrow "C" in FIG. 9B. When the adjustable bed carriage 30 is to be moved from the retracted condition (FIG. 11B) (or from an intermediate position) to or towards the extended condition, the movable portion 72 is pushed outwardly from the motor body 74 in the direction of arrow "D" in FIG. 11B.

In the preferred embodiment, the adjustable bed 64 includes a linkage assembly (also referred to as a scissor leg assembly) 74 which includes the adjustable bed carriage 30 with follower struts 78, 79 (FIGS. 1–4), as will be described. As can be seen in FIGS. 1–4, the first legs 40, 41 include a caster base 80 positioned distal to the first end 44 of the main bed frame 32. The caster base 80 includes one or more casters 58 for engaging the floor 34.

Figure 12A:
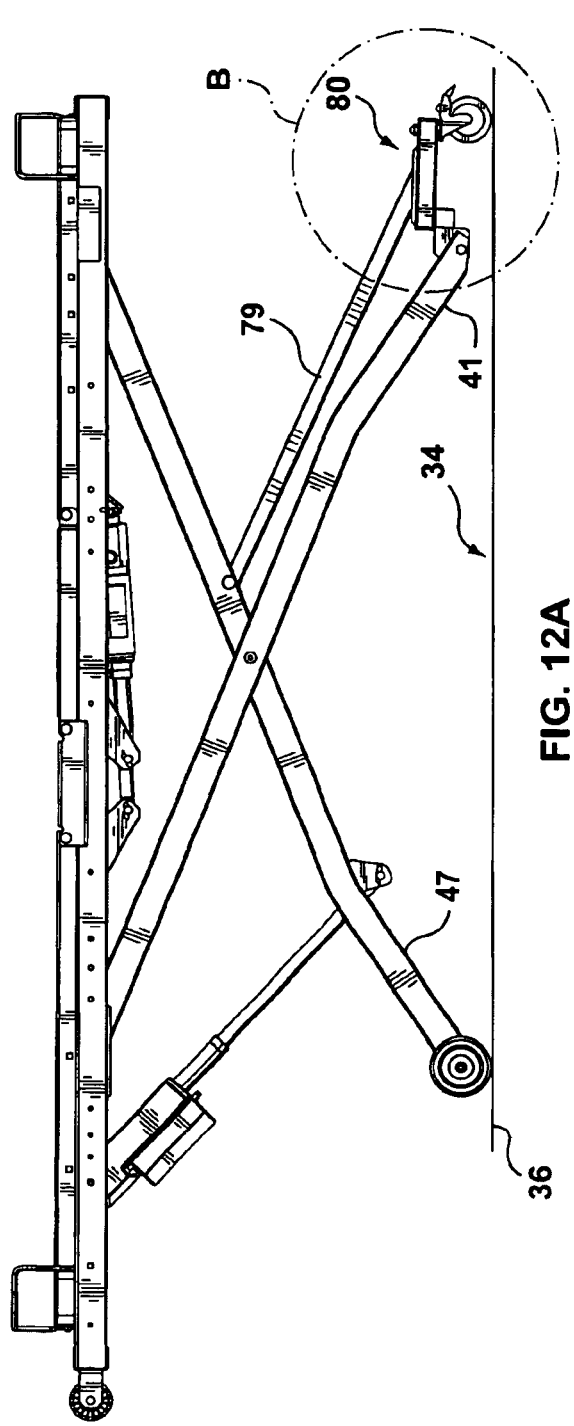
FIG. 12A is a side view of the adjustable bed carriage of FIG. 1 in the extended condition and the main bed frame.
Figure 12B:
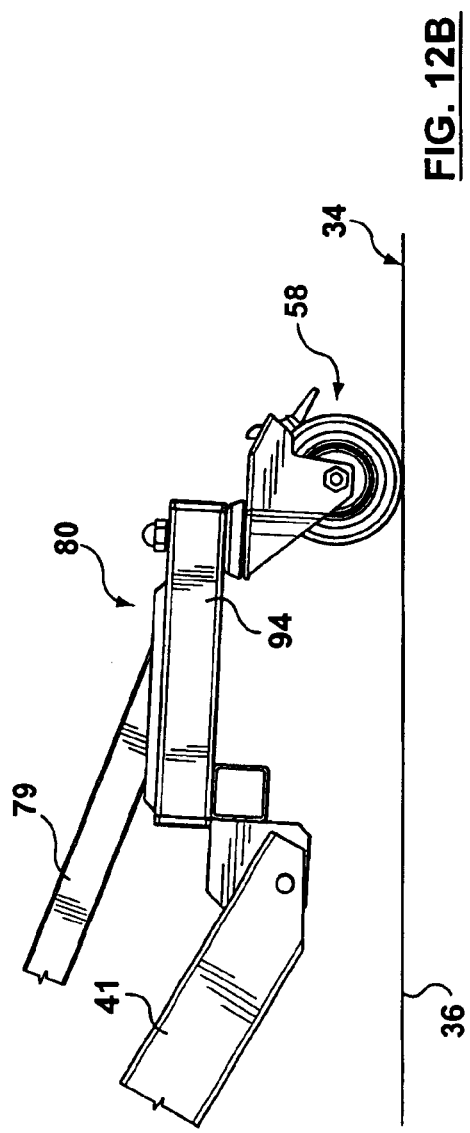
FIG. 12B is a side view of a caster base included in the adjustable bed carriage of FIG. 12A, drawn at a larger scale.
Figure 13A:
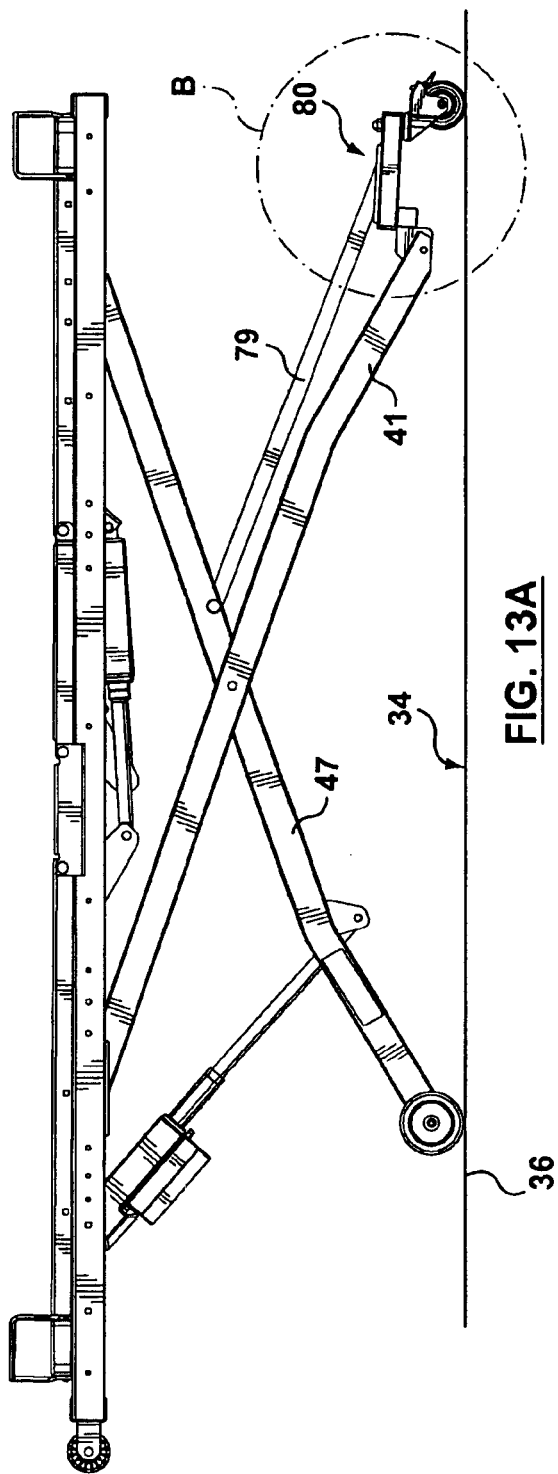
FIG. 13A is a side view of the adjustable bed carriage of FIG. 12A and the main bed frame, showing the adjustable bed carriage in a first intermediate condition, drawn at a smaller scale.
Figure 13B:
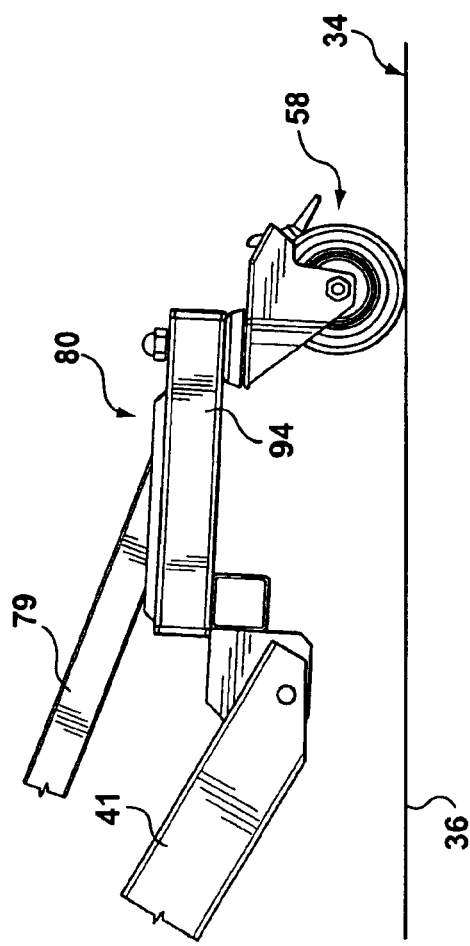
FIG. 13B is a side view of the caster base included in the adjustable bed carriage of FIG. 13A, drawn at a larger scale.
Figure 14A:
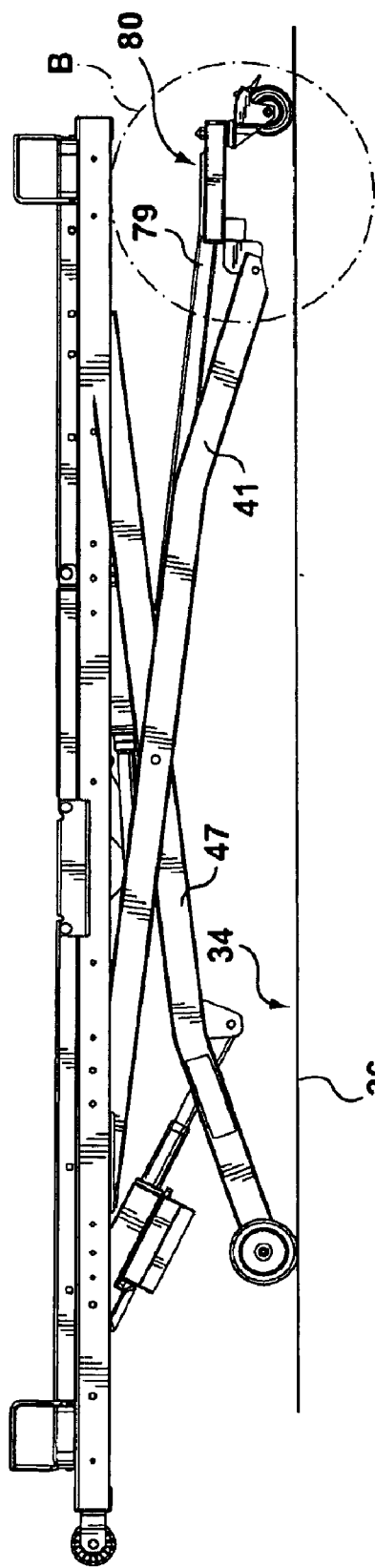
FIG. 14A is a side view of the adjustable bed carriage of FIG. 12A and the main bed frame, with the adjustable bed carriage in a second intermediate condition, drawn at a smaller scale.
Figure 14B:
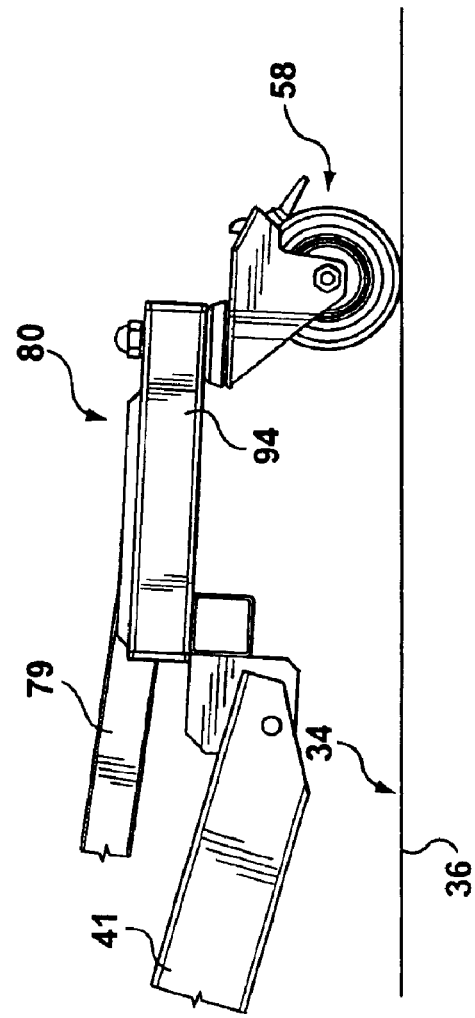
FIG. 14B is a side view of the caster base included in the adjustable bed carriage of FIG. 14A, drawn at a larger scale.
Figure 15A:
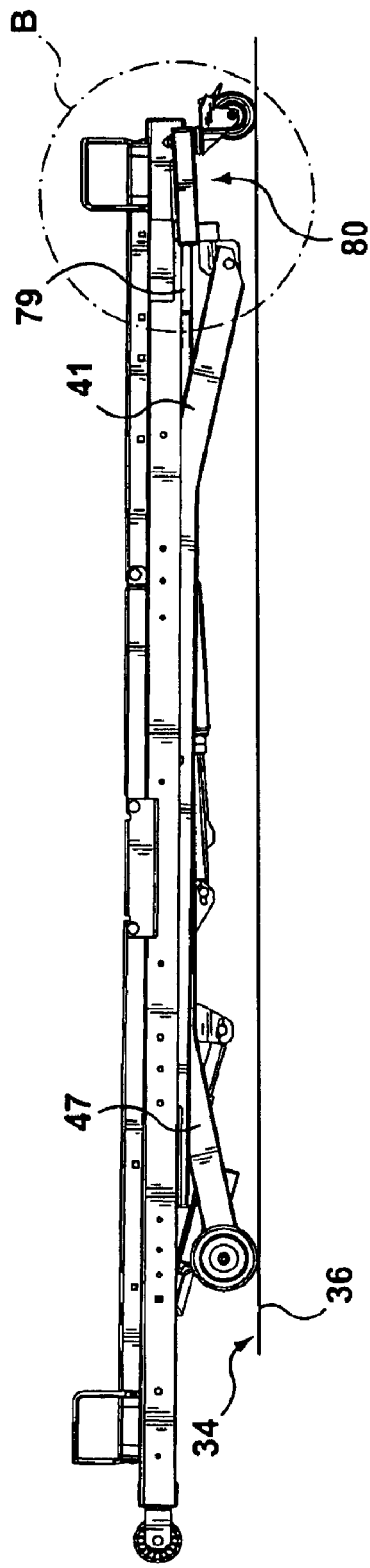
FIG. 15A is a side view of the adjustable bed carriage of FIG. 12A and the main bed frame, with the adjustable bed carriage in the retracted condition, drawn at a smaller scale.
Figure 15B:
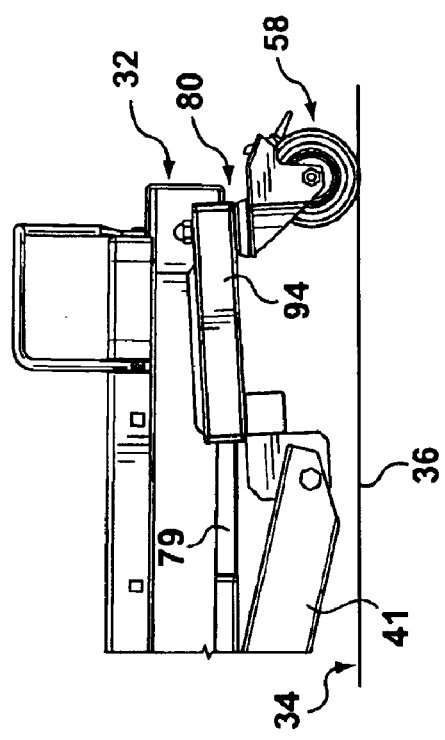
FIG. 15B is a side view of the caster base included in the adjustable bed carriage of FIG. 15A, drawn at a larger scale.

Preferably, the caster base 80 is disposed in a preselected position relative to the plane 36 of the floor 34 when the linkage assembly is in the extended condition, as shown in FIGS. 12A, 12B. The follower struts 78, 79 each have respective upper ends 81, 82 and lower ends 83, 84. As can be seen in FIGS. 1, 2 and 9B, in the preferred embodiment, the lower ends 83, 84 are pivotably attached to the caster base 80. The upper ends 81, 82 of the follower struts 78, 79 are pivotably attached to the second legs 46, 47 respectively (FIG. 9B). This pivotable attachment is at predetermined pivot points 86, 87 on the second legs 46, 47 above the central pivots 52, 53. The predetermined pivot points 86, 87 are selected so that the follower struts 78, 79 can act on the caster base 80 to maintain the caster base 80 substantially in the preselected position relative to the plane 36 of the floor 34 as the linkage assembly 76 moves between the extended and retracted conditions.

As can be seen in FIGS. 12A, 12B, 13A, 13B, 14A, 14B, 15A, and 15B, in the preferred embodiment, the follower struts 78, 79 only maintain the caster base 80 in substantially the preselected position relative to the plane 36. Generally, for example, a top surface 88 which is substantially planar is approximately horizontal in FIG. 12A. However, the top surface 88 may be gradually inclined, up to approximately 3–5° from the horizontal (FIGS. 13B, 14B, 15B), as the linkage assembly is moved to the retracted position.

The follower struts 78, 79 form a "modified" parallelogram with the legs 40, 41 and portions of the legs 46, 47, i.e., they preferably do not form a perfect parallelogram. The location of the follower struts does not provide perfect alignment, as a perfect parallelogram would, but is optimized to provide the best alignment possible. As the bed is raised, the angle changes above and below horizontal so that the bed has a level surface at the highest and lowest positions while maintaining a substantially level surface through the range of motion from high to low.

In the preferred embodiment, the caster base 80 includes one or more locator elements 89, 90 to which the lower ends 83, 84 of the follower struts 78, 79 are pivotably attached. Each of the locator elements 89, 90 is positioned so as to enable the follower struts 78, 79 to maintain the caster base 80 in substantially the preselected position relative to the plane 36 of the floor 34.

Figure 9A:
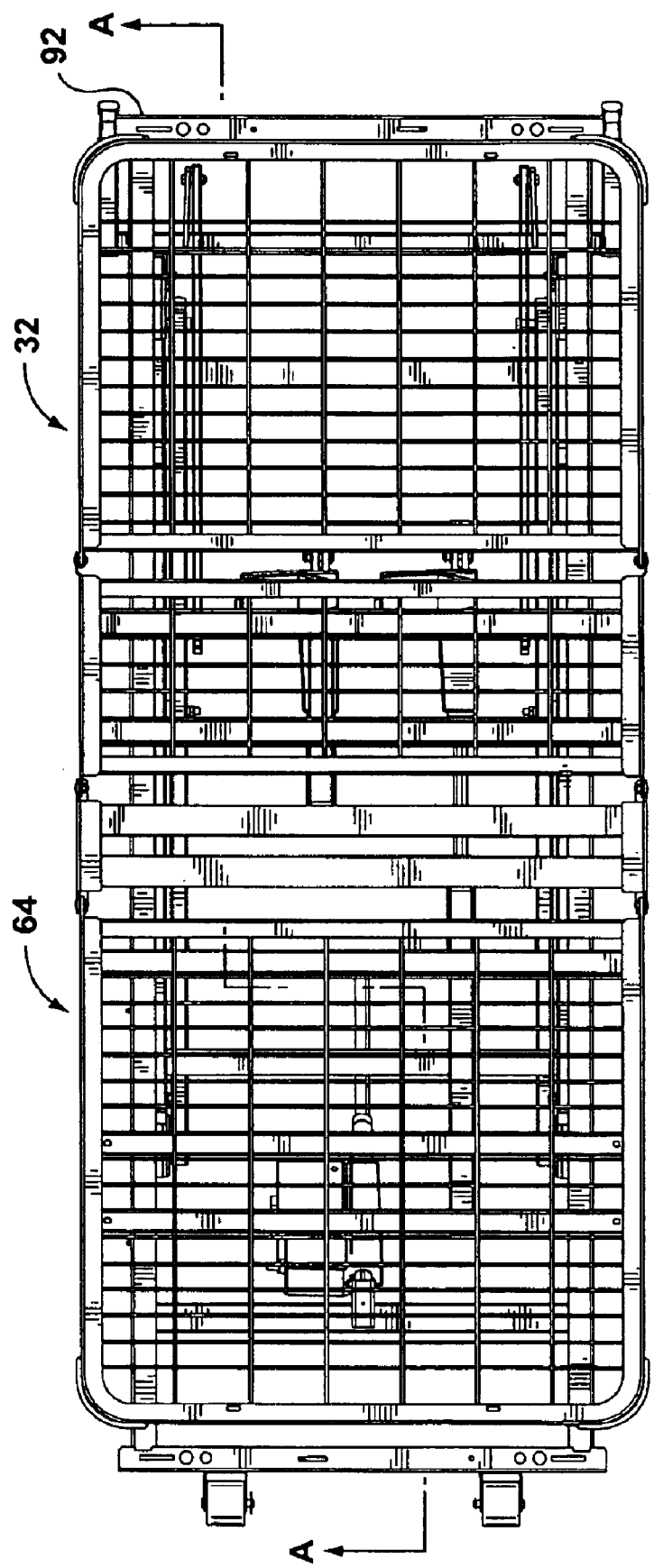
FIG. 9A is a top view of the adjustable bed carriage of FIG. 1 in the extended condition, as well as the main bed frame.
Figure 9B:
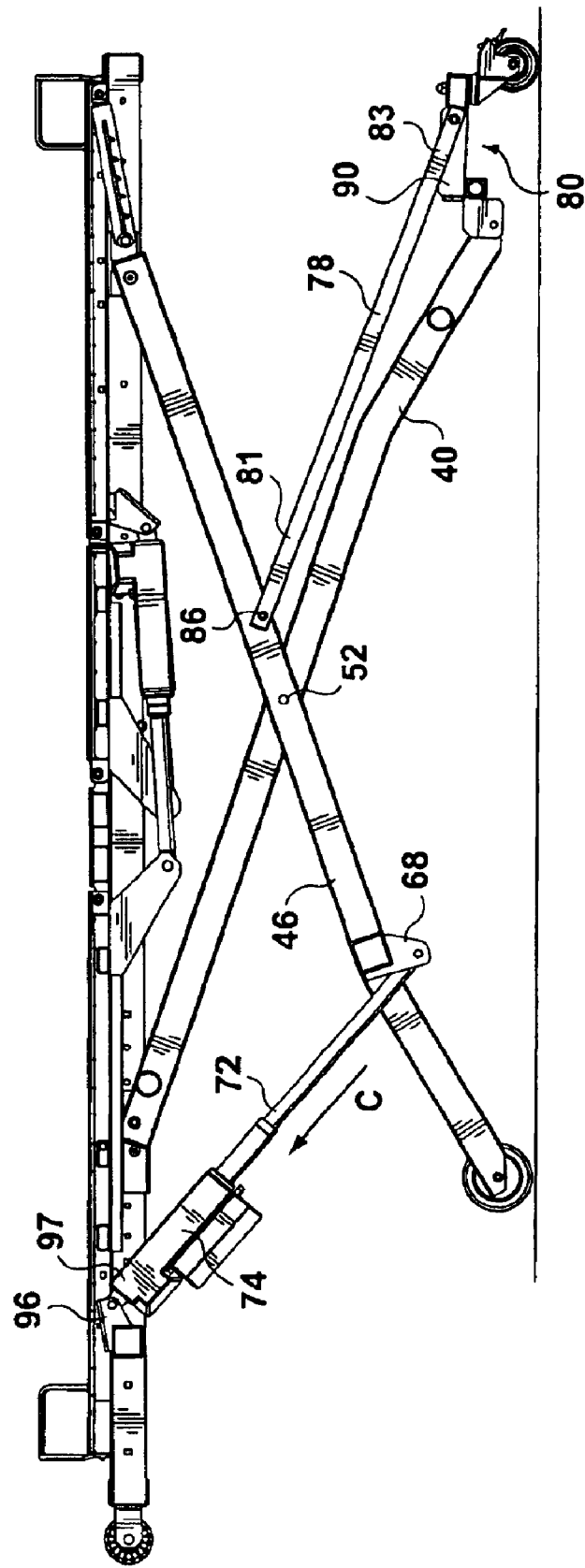
FIG. 9B is a section view of the adjustable bed carriage of FIG. 9A and the main bed frame, taken along line A—A in FIG. 9A.
Figure 10:
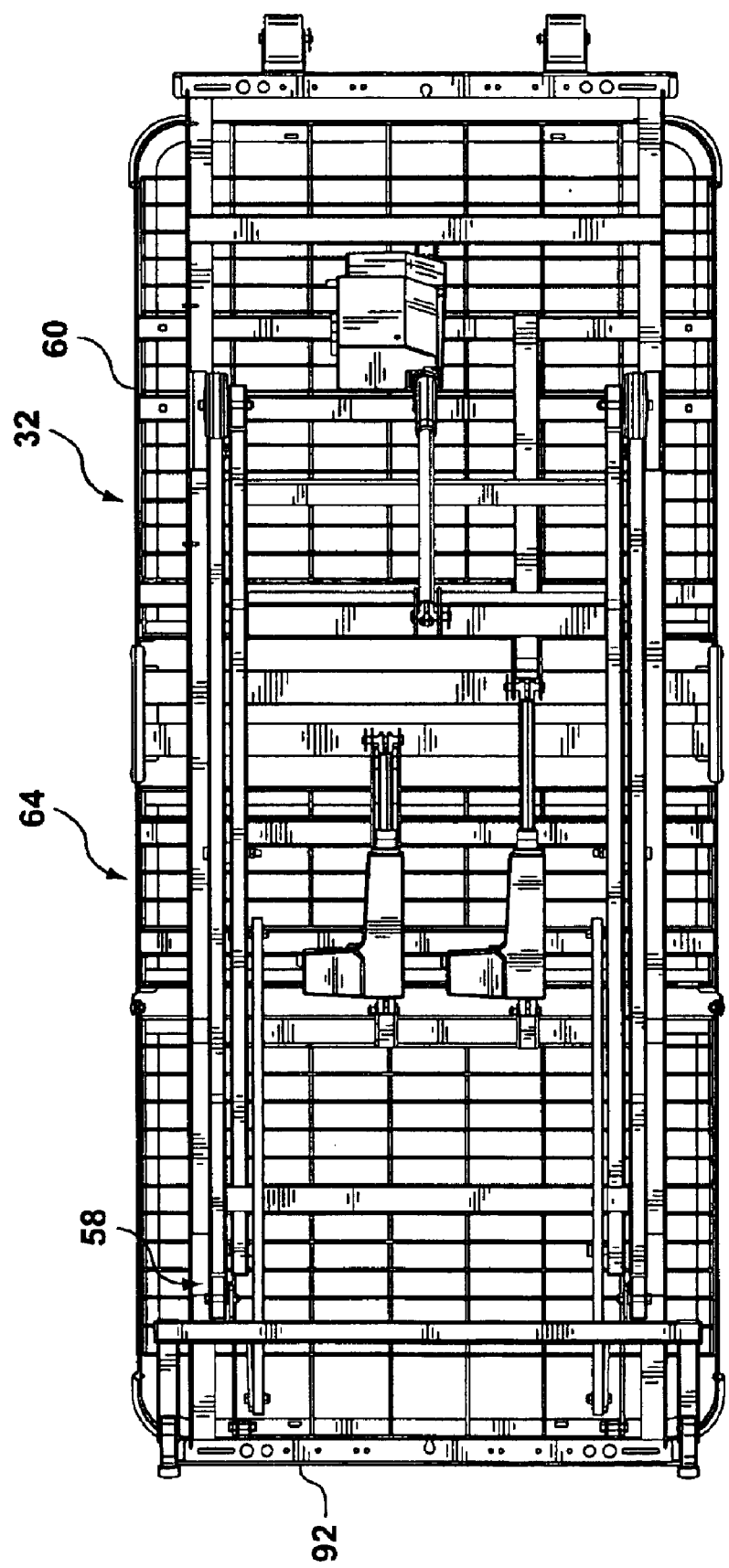
FIG. 10 is a bottom view of the adjustable bed carriage of FIG. 1 in the extended condition and of the main bed frame.

Preferably, main bed frame 32 defines a footprint periphery 90 circumscribing the perimeter of the main bed frame 32 (FIGS. 9A, 10, 11A). In addition, the caster base 80 includes one or more mounting brackets 94 positioned, at least in part, adjacent to footprint periphery 92. Due to the positioning of the mounting brackets 94, caster locks on the casters 58 are readily accessible by the operator, even when the adjustable bed carriage 30 is in the retracted condition, as shown in FIG. 11A.

In use, the motor 66 is activated by a switch or other control means (not shown), as is known in the art, if movement of the linkage assembly 76 between the extended condition and the retracted condition, and consequent movement of the main bed frame 32 relative to the plane 36 of the floor 34, is desired. For example, referring to FIGS. 12A, 13A, 14A, and 15A, to move the linkage assembly 76 from the extended condition (FIG. 12A) to the retracted condition (FIG. 51A), the movable portion 72 is retracted into the motor body 74. Retracting of the movable portion 72 is controlled by an electric motor in the motor body 74, thereby ensuring that the retracting is at a desired rate (i.e., controlled by an operator (not shown)). Also, as will be appreciated by those skilled in the art, the retraction could be stopped, if the operator wishes to have the linkage assembly remain at any position intermediate between the extended and retracted conditions. The motor 66 holds the adjustable bed carriage 30 in the intermediate position.

Preferably, and as shown in FIG. 9B, the motor 66 is pivotably mounted to a flange 96 which is secured to the main bed frame 32. The flange 96 is positioned so as to locate an upper end 97 of the motor 66 as high (in relation to the plane 36 of the floor 34) as is feasible. Also, the flange 96 is positioned as low (in relation to the plane 36 of the floor 34) as is feasible. The result is that the initial raising force required to raise the linkage assembly from the retracted condition (FIGS. 11B, 15B) is relatively low.

It will be appreciated by those skilled in the art that the main bed frame 32 can comprise a chassis portion 98 and deck portions 100 mounted on the chassis portion 98 (FIG. 2). The main deck portions 100 (which would support a mattress (not shown) when in use) are positionable in a variety of positions relative to the chassis portion 98, as is known in the art. For example, the deck portions 100 are positionable so as to allow adjustable head and foot elevation, so that the patient can be positioned as necessary. Preferably, motors 102 are used to position deck portions 100 accordingly, as is known in the art.

Preferably, the legs 40, 41 and 46, 47 are configured so as to provide maximum clearance between the floor 34 and the adjustable bed carriage 30 through a middle portion of the adjustable bed carriage 30, when in the retracted condition (FIGS. 5, 6). As shown in FIGS. 5 and 6, because the legs 40, 41 and 46, 47 each include lower ends which are bent relative to the substantially straight elongate other portions of the legs 40, 41, 46, 47, such clearance is provided in the middle portion of the adjustable bed carriage 30 when the adjustable bed carriage is in the retracted condition. Preferably, the bent portion is aligned at a significant angle (e.g., up to approximately 11.5°) from the axis of the main portions of each leg. Due to the clearance, lift devices, movable tables and other devices for use by or with a patient (not shown) which require clearance under the adjustable bed carriage 30 for their operation can be used, when the adjustable bed carriage 30 is at any height.

The adjustable bed carriage 30 has the advantage of including slidable connections only where the first legs 40, 41 are connected to the main bed frame 32. The second legs 46, 47 are only pivotably connected to the main bed frame 32, rather than also being slidably connected. The cost of manufacturing the adjustable bed carriage 30 is thereby significantly reduced, and its operation is much simpler, and therefore more reliable.

Figure 16A:
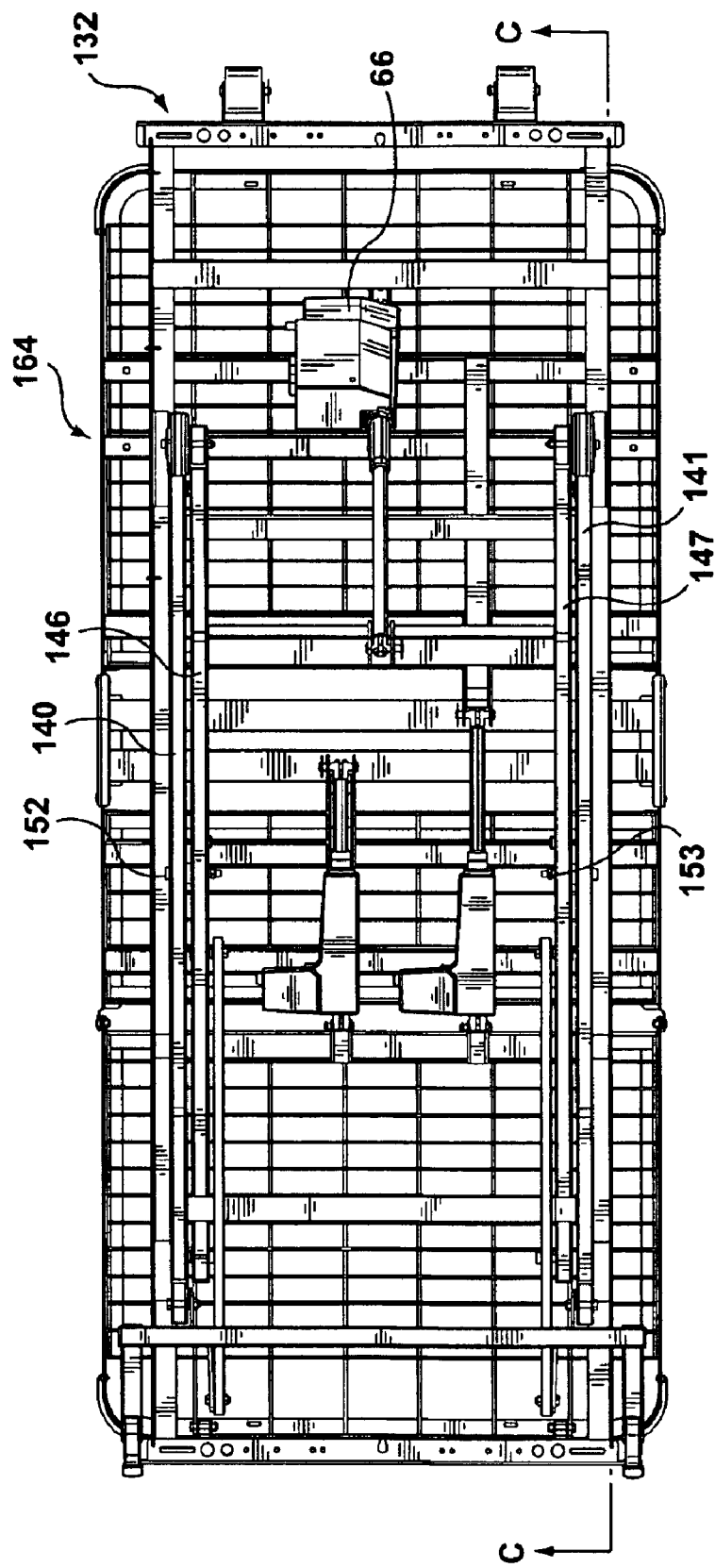
FIG. 16A is a bottom view of an alternative embodiment of the adjustable bed, drawn at a smaller scale.
Figure 16B:
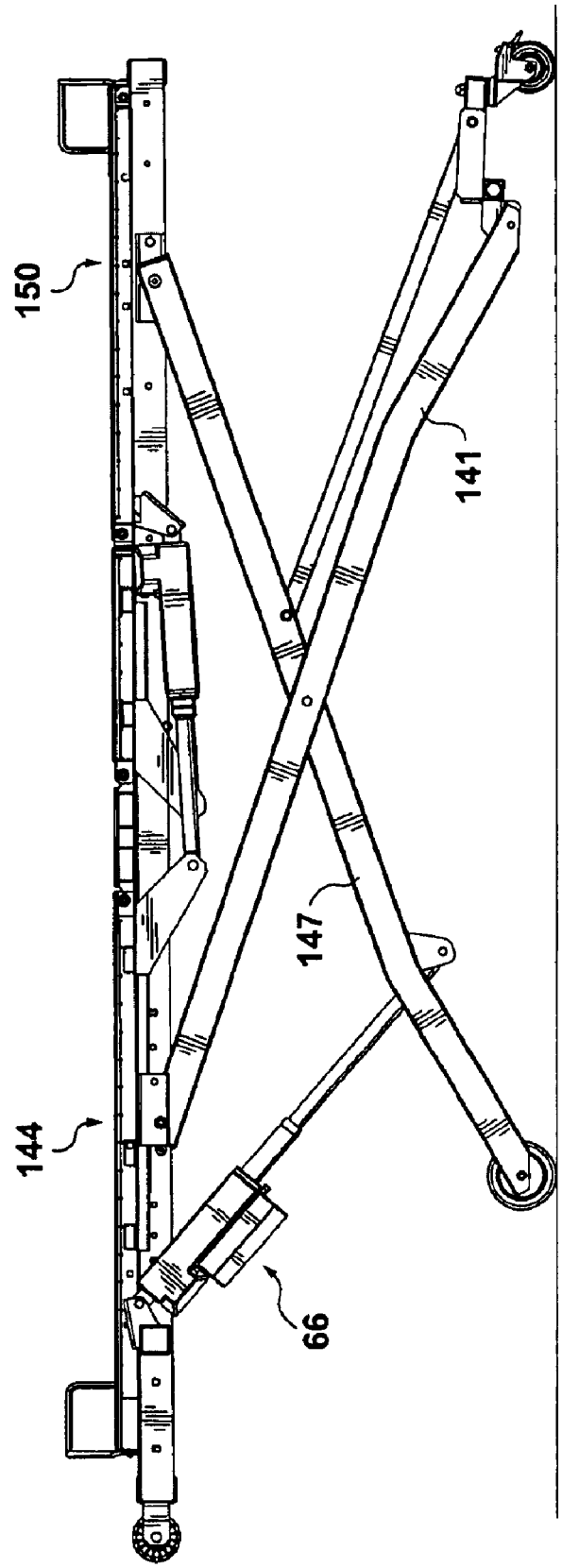
FIG. 16B is a section view of the adjustable bed of FIG. 16A, taken along line C—C in FIG. 16A.

In another embodiment, as shown in FIGS. 16A and 16B, an adjustable bed 164 has an adjustable bed carriage 130 in which the first legs 140, 141 are pivotably connected to the main bed frame 132 at a first end 144 and the second legs 146, 147 are slidably connected to the main bed frame 132 at a second end 150. As can be seen in FIG. 16b, the motor 66 is preferably mounted on the main bed frame 132 and pivotably connected to the adjustable bed carriage 130. More particularly, the motor 66 is preferably pivotably connected to the second legs 46, 47 at a point below the central pivots.

Figure 17:
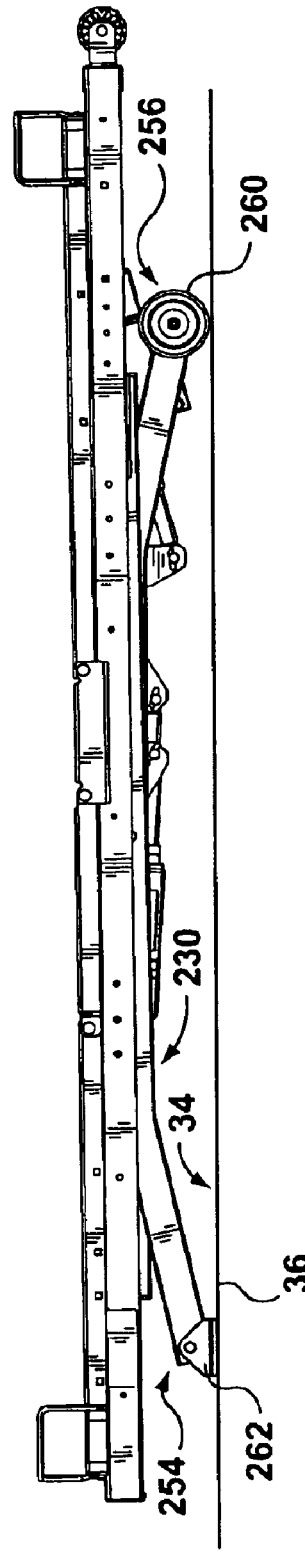
FIG. 17 is a side view of an alternative embodiment of the adjustable bed showing the adjustable bed carriage in the retracted condition.

In an alternative embodiment, shown in FIG. 17, an adjustable bed carriage 230 includes a first leg base 254 including one or more foot elements 262 for engaging the floor 34. As can be seen in FIG. 17, the adjustable bed carriage 230 additionally includes a second leg base 256 including wheels 260.

Figure 18:
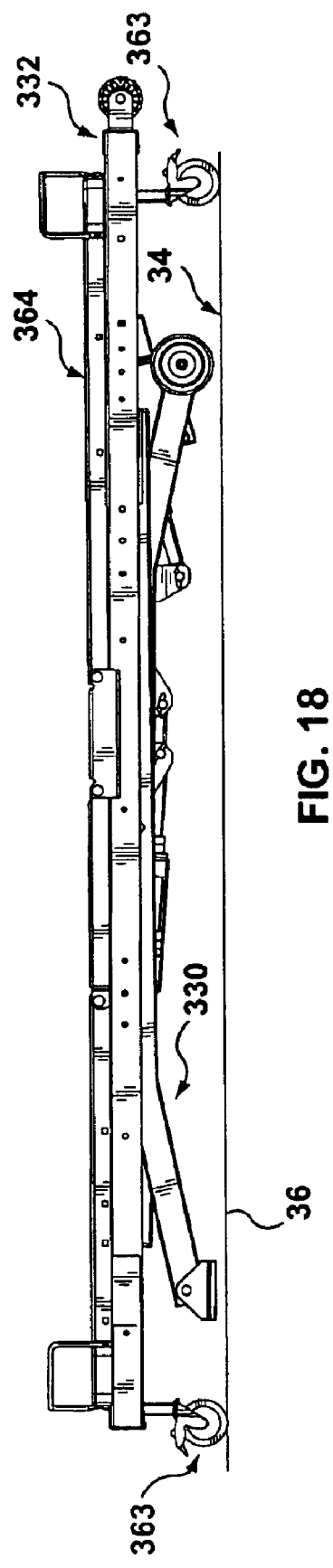
FIG. 18 is a side view of another alternative embodiment of the adjustable bed showing the adjustable bed carriage in the retracted condition.

In another alternative embodiment, an adjustable bed 364 includes one or more casters 363 mounted on the main bed frame 332. As shown in FIG. 18, the casters 63 are mounted so that, when the adjustable bed carriage 330 is in the retracted condition, the casters 363 engage the floor 34. Accordingly, the adjustable bed 364 can be moved on the casters 363 when the adjustable bed carriage 330 is in the retracted condition.

In another alternative embodiment, an adjustable bed 464 (shown in FIGS. 19, 20, 21A–F, and 22–24) includes a lock actuator assembly 404. Preferably, the adjustable bed 464 includes a main bed frame 432 supported by an adjustable bed carriage 430 which includes one or more casters 458. It is preferred that, as is known in the art, casters 458 on the adjustable bed 464 include caster locks (not shown). For example, a Tente-Rollen model 2946 UAP 100 R26-28S45 includes a caster lock which, when activated, prevents rotation of a caster wheel about a caster wheel axis and also prevents a caster housing (in which the caster wheel is mounted) from pivoting about a caster stem.

Other locking means can be used instead of caster locks. For example, the adjustable bed carriage could include a foot assembly (not shown), movable between a lowered position, in which the foot engages the floor and supports the main bed frame above its usual position, so that the caster is raised off the floor, and a raised position in which the foot does not engage the floor. In this alternative embodiment, the lock actuator assembly actuates the foot, causing it to move to the lowered position, upon the occurrence of a triggering event.

Figure 19:
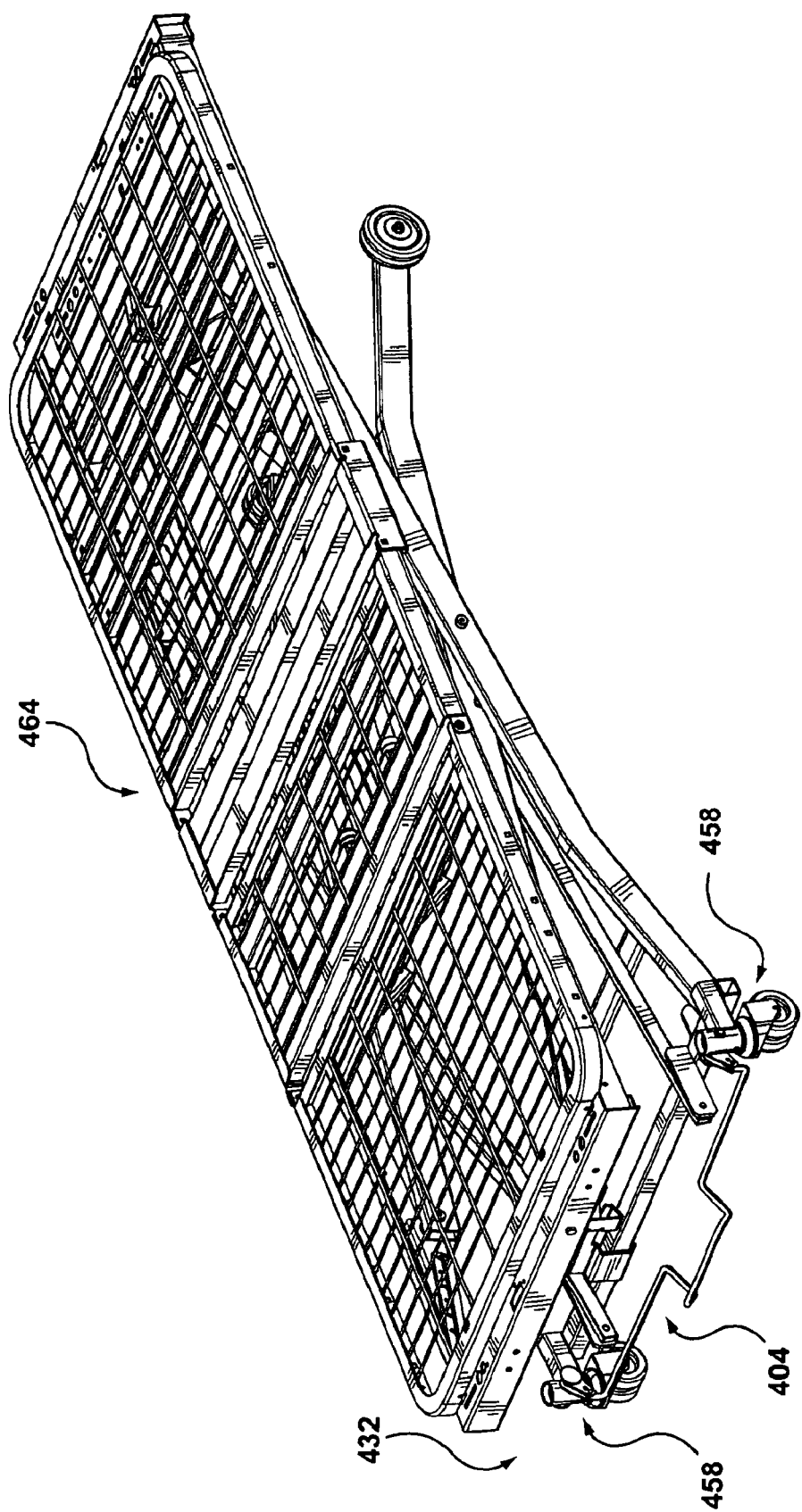
FIG. 19 is an isometric view of another alternative embodiment of an adjustable bed of the invention including an actuator assembly positioned at a front end of the adjustable bed, the adjustable bed carriage thereof being shown in an intermediate condition, drawn at a smaller scale.
Figure 20:
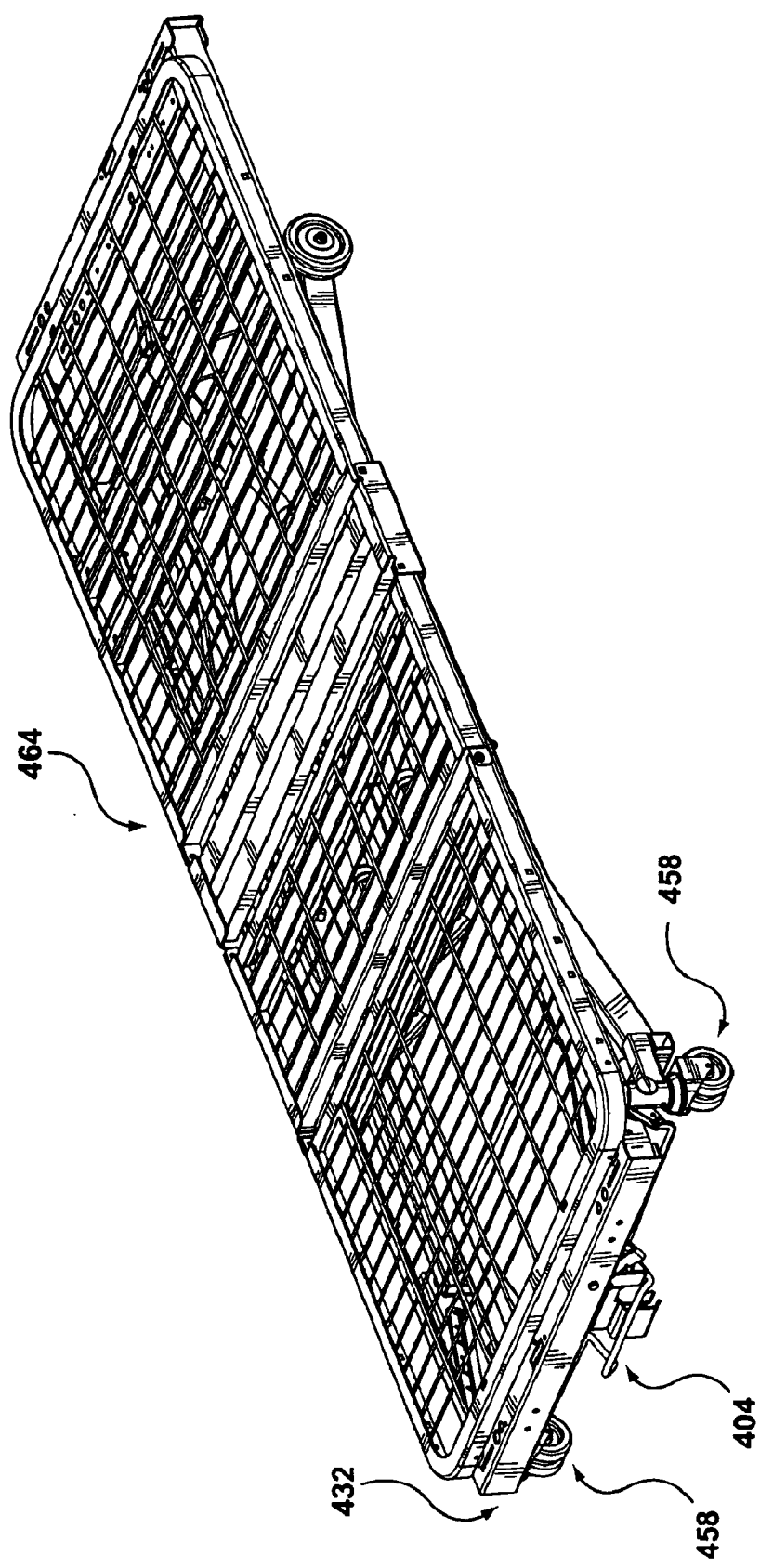
FIG. 20 is an isometric view of the adjustable bed of FIG. 19, showing the adjustable bed carriage in a retracted condition.
Figure 21A:
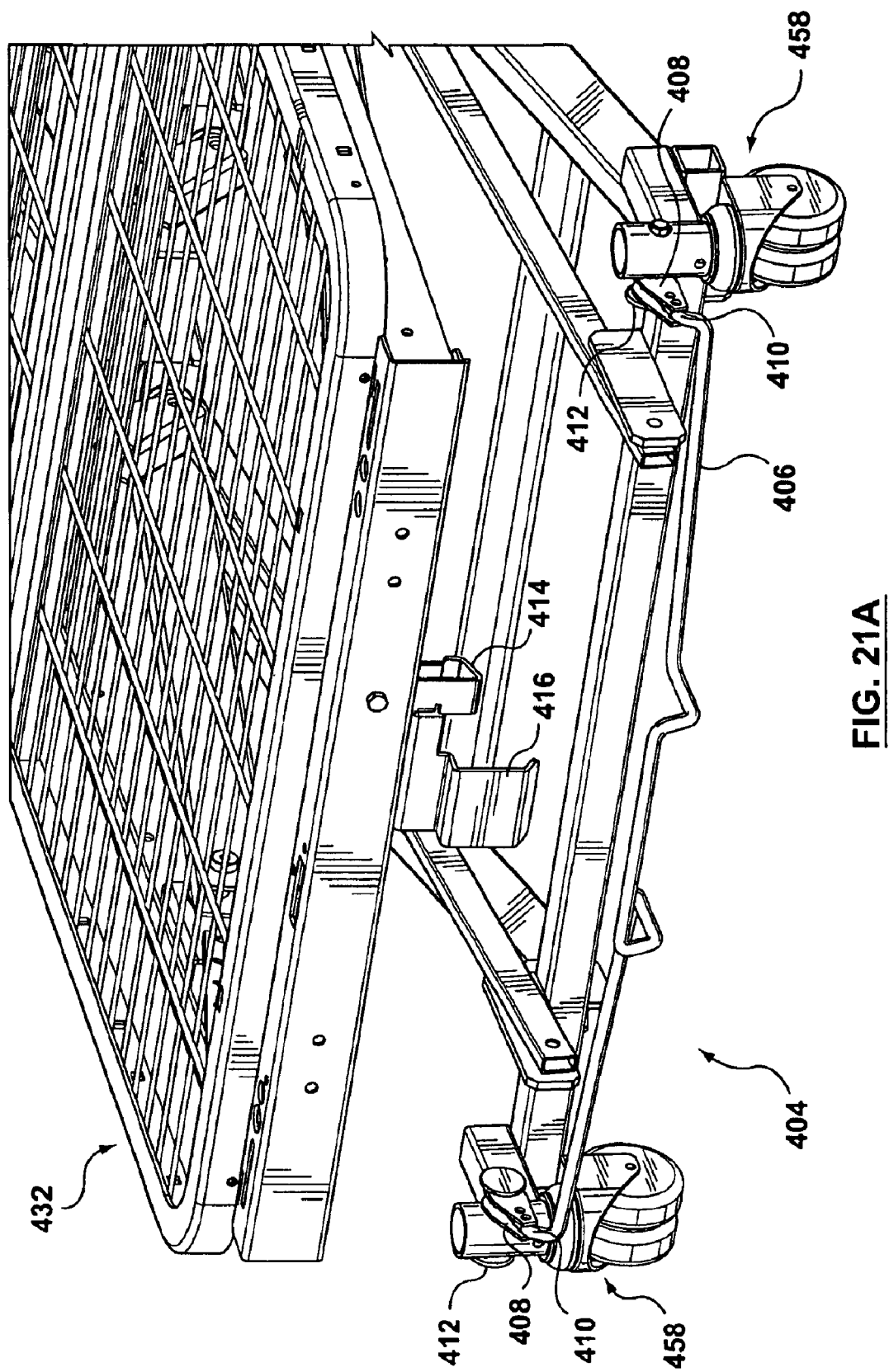
FIG. 21A is an isometric view of the front end of the adjustable bed of FIG. 19 showing the adjustable bed carriage in the intermediate condition, drawn at a larger scale.
Figure 21B:
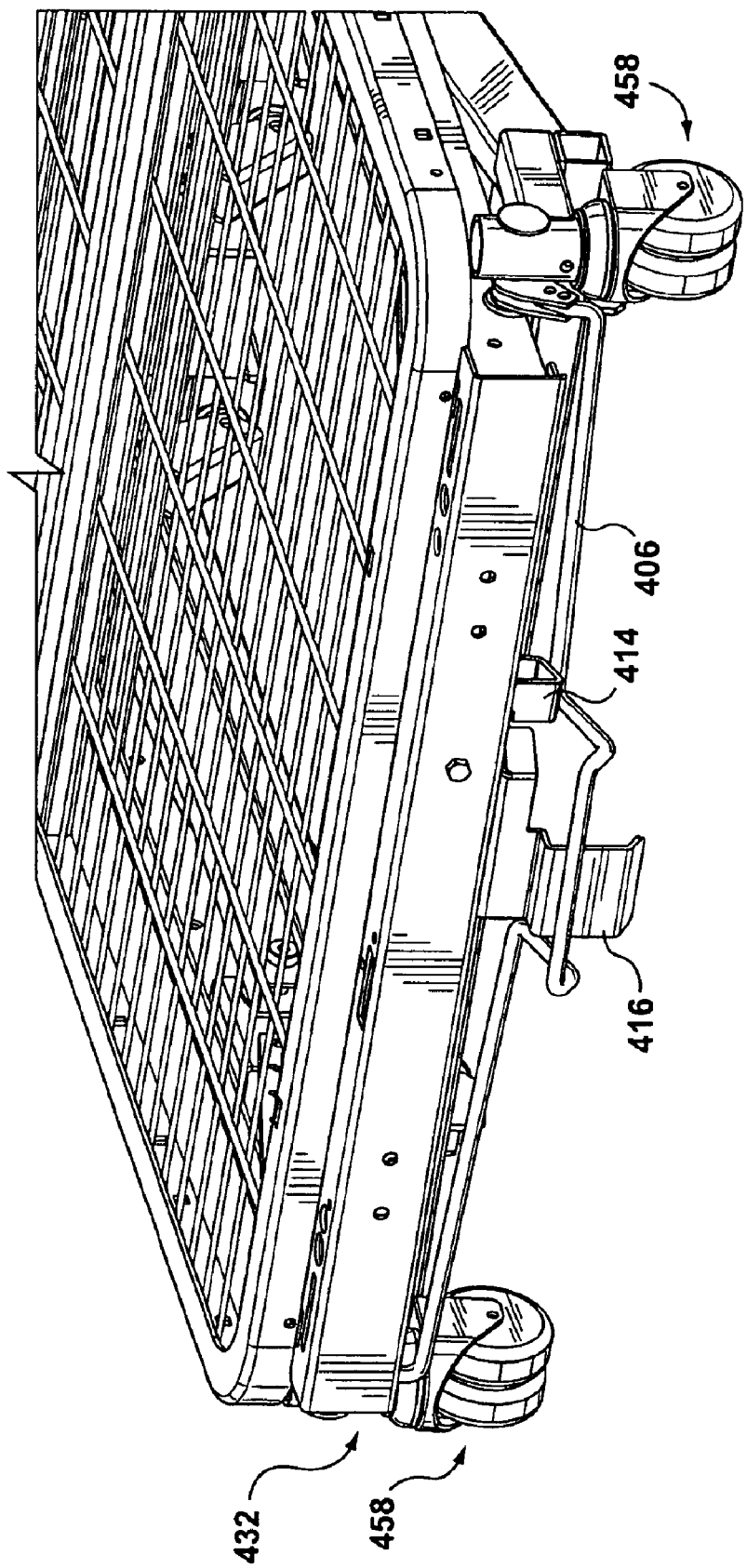
FIG. 21B is an isometric view of the front end of the adjustable bed of FIG. 20 showing the adjustable bed carriage in the retracted condition.
Figure 21C:
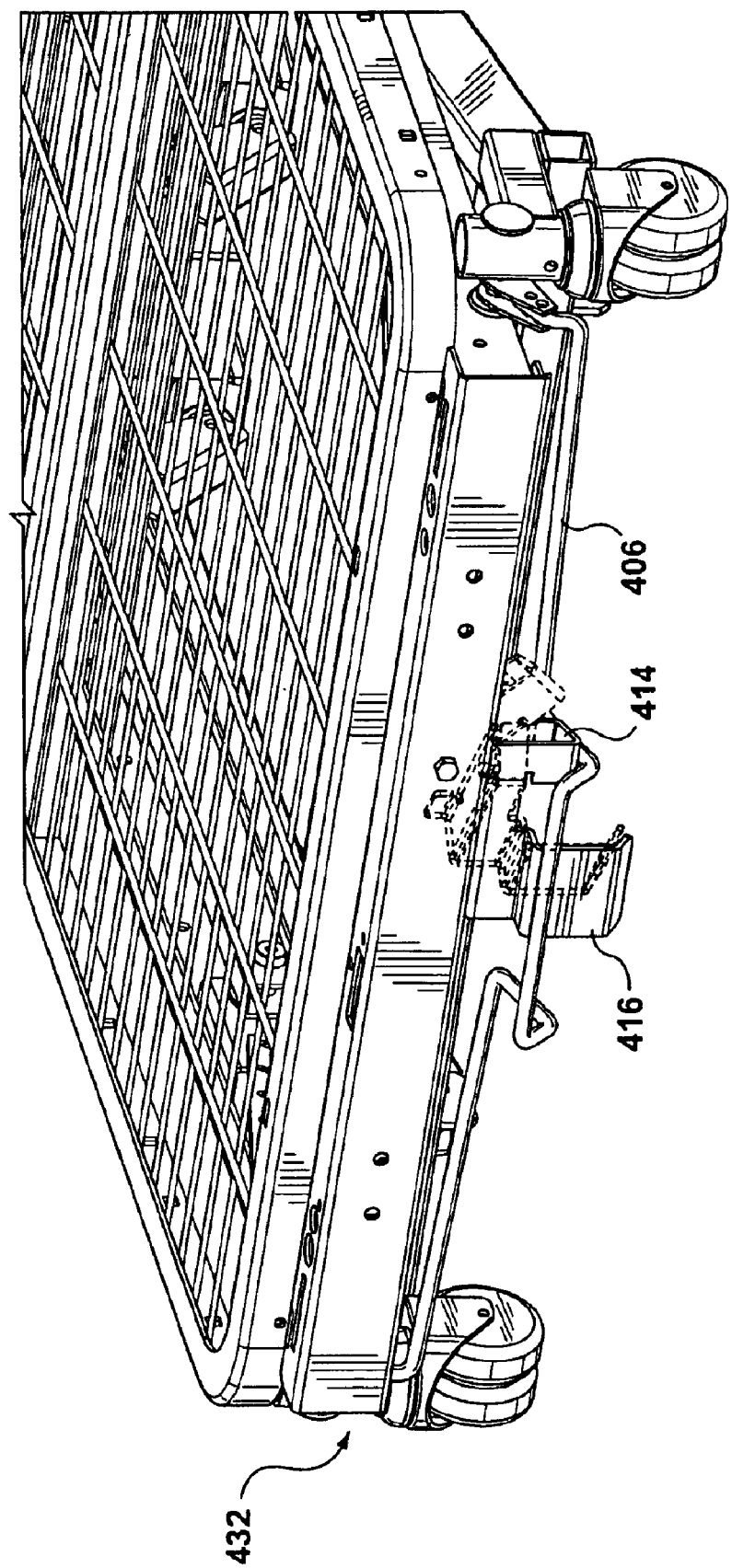
FIG. 21C is an isometric view of the front end of the adjustable bed of FIG. 20 showing the adjustable bed carriage in the retracted condition showing a release mechanism in a released position.
Figure 21D:
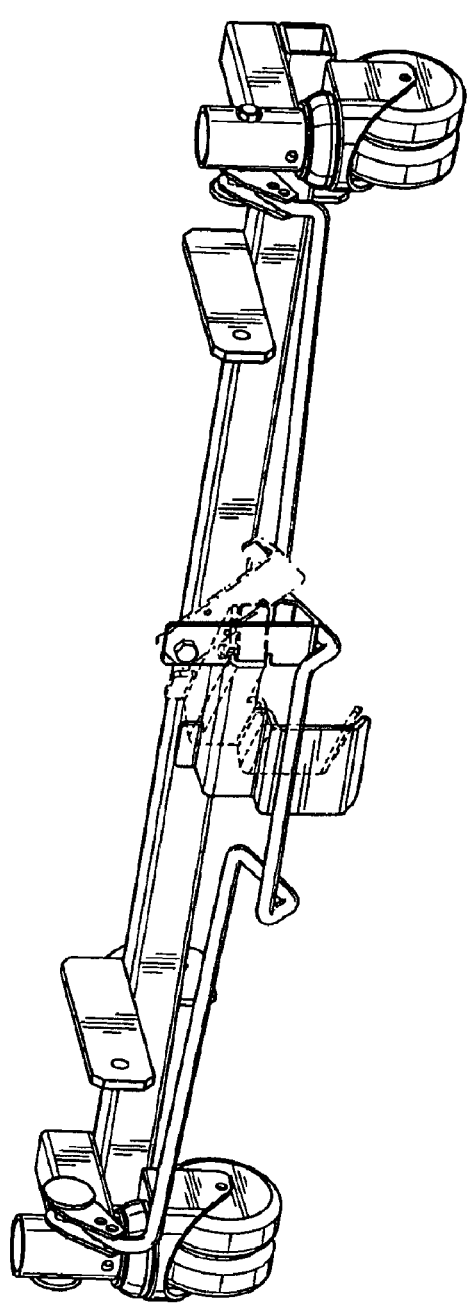
FIG. 21D is a partial isometric view of the actuator assembly and part of the adjustable bed showing the release mechanism in the released position in dotted outline.

Preferably, the lock actuator assembly 404 includes a lock bar 406 secured in two connectors 408, one located at each end 410 of the lock bar 406 (FIGS. 19, 21A, 21B). The connectors 408 are in turn each secured to activators 412 respectively. The lock bar 406 is movable between an activated position (FIG. 20), in which the connectors 408 cause the activators 412 to activate the caster locks, and a deactivated position (FIG. 19), in which the activators 412 are maintained in a position which does not result in activation of the caster locks. Movement of the lock bar 406 from the deactivated position to the activated position results in rotation of the activators 412. This in turn causes the caster locks to lock. Movement of the lock bar 406 from the activated position to the deactivated position causes rotation of the activators in the other directions, so that the caster locks are thereby unlocked.

Preferably, an actuator 414 is mounted on the main bed frame 432, for engaging the lock bar 406 when the main bed frame 432 is moved downwardly to an engagement position (FIG. 20). The lock bar 406 is normally in the deactivated position. It is preferred that the engagement position be at a height which is close (i.e., a relatively small distance above) to the main bed frame's fully lowered position. Upon the main bed frame 432 being lowered to the engagement position, the actuator 414 engages the lock bar 406, urging the lock bar 406 to move from the deactivated position (FIG. 19) to the activated position (FIG. 20). The caster lock is thereby activated.

Figure 21E:
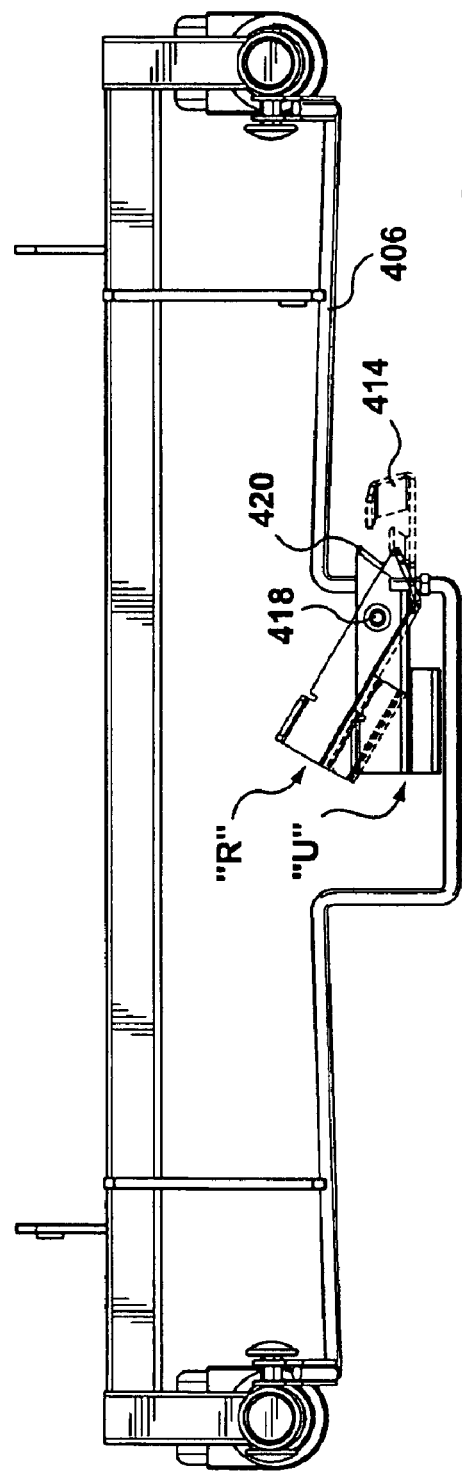
FIG. 21E is a top view of the actuator assembly of FIG. 21D, showing the release mechanism in unreleased and released positions.
Figure 21F:
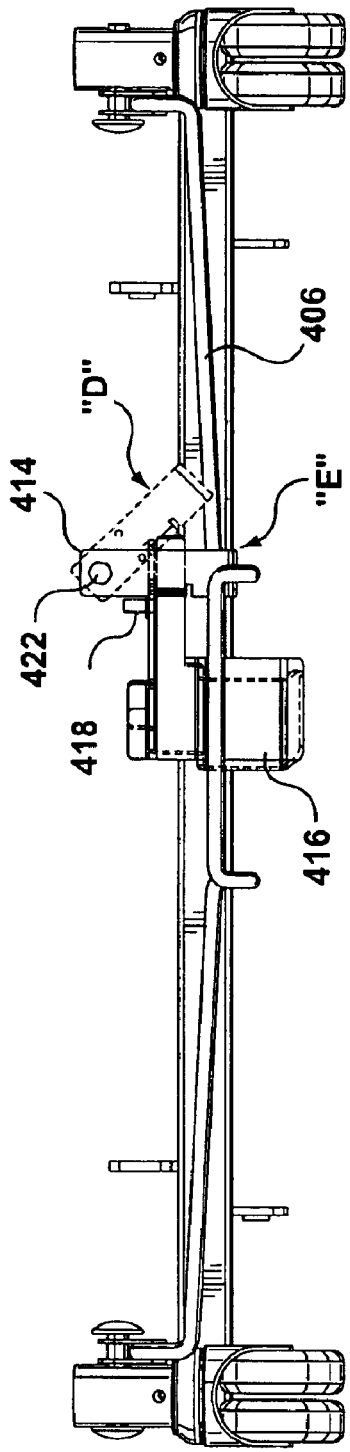
FIG. 21F is a front view of the actuator assembly of FIG. 21D, showing the release mechanism in unreleased and released positions.
Figure 22:
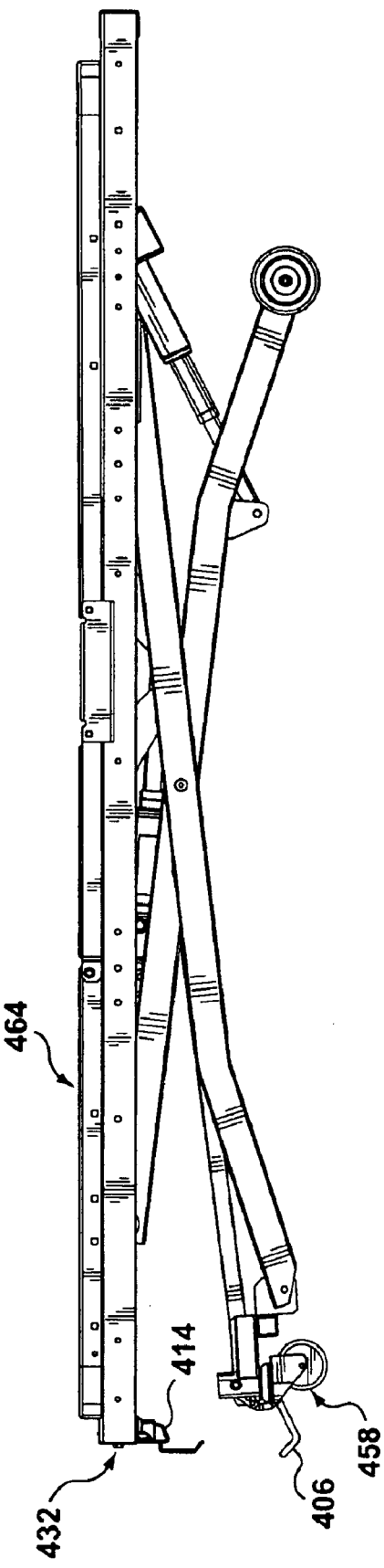
FIG. 22 is a side view of the adjustable bed of FIG. 19, drawn at a smaller scale.
Figure 23:
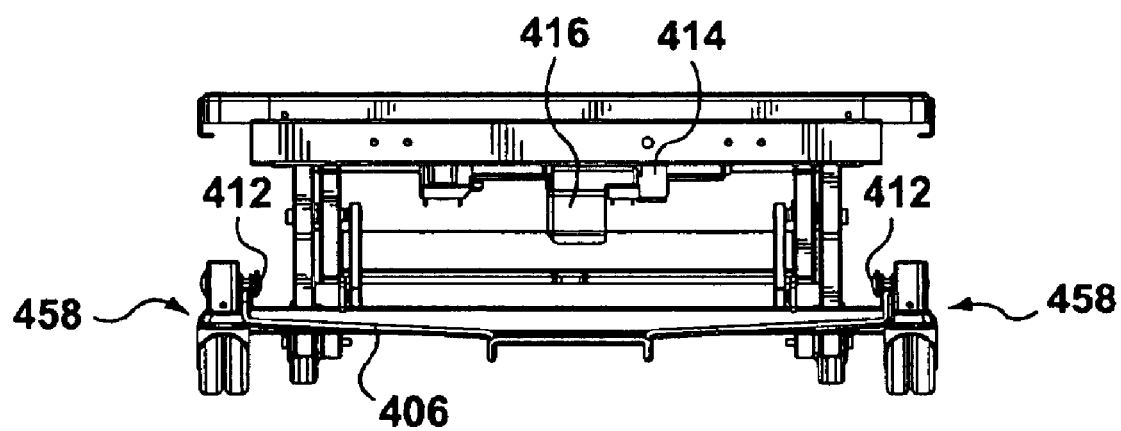
FIG. 23 is an elevation view of the front end of the adjustable bed of FIG. 22.
Figure 24:
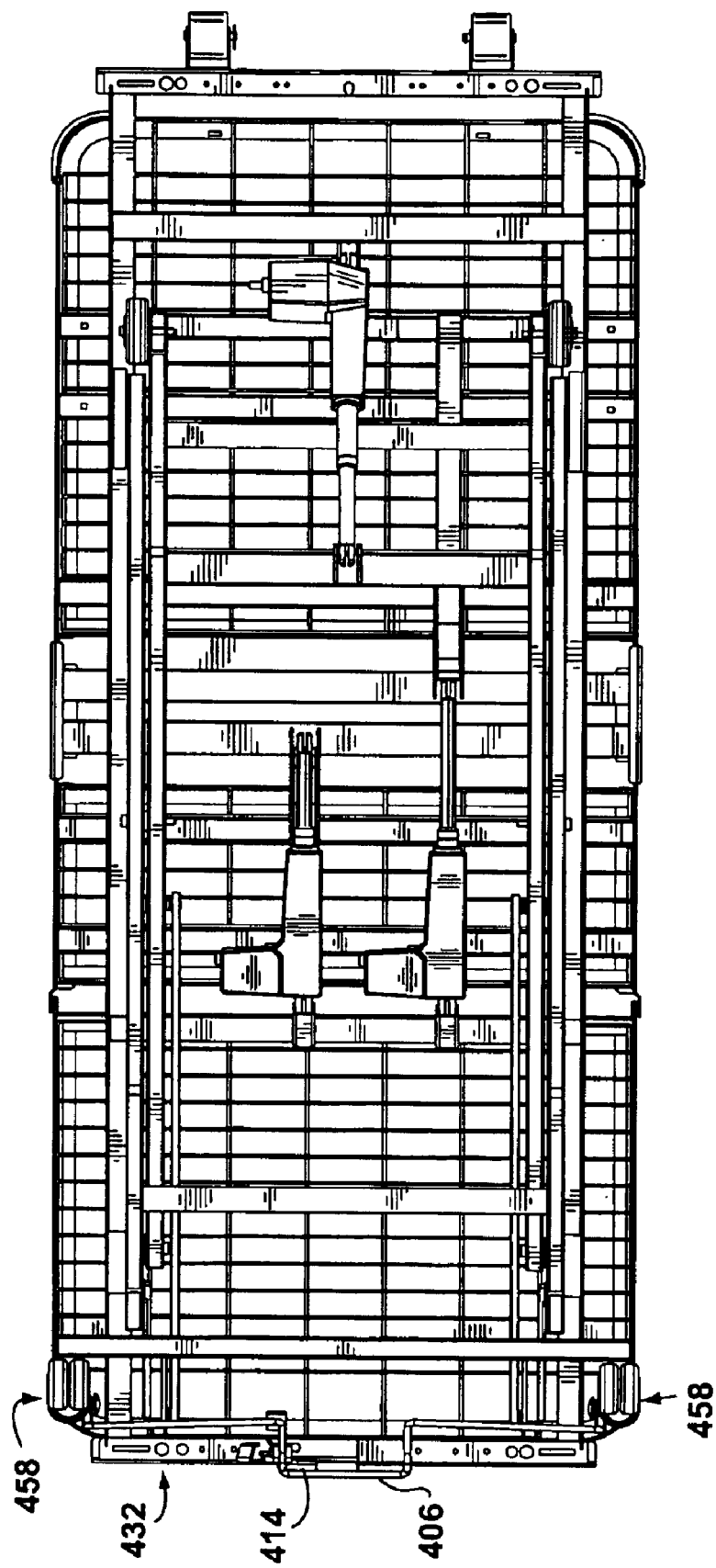
FIG. 24 is a bottom view of the adjustable bed of FIG. 22.

The actuator assembly 404 also includes a release plate 416 which is engageable with the actuator 414. As can be seen in FIGS. 21C, 21D, 21E, and 21F, the release plate 416 is attached to the frame 432 by a pin 418 about which the release plate 416 is pivotable. The release plate includes a bevelled edge 420 which is positioned adjacent to the actuator 414. As can be seen in FIG. 21F, the actuator 414 is also attached to the main bed frame 432 by an actuator pin 422, about which the actuator is also pivotable.

Preferably, the bevelled edge 420 forms a cam surface so that, when the release plate 416 is pivoted about the pin 418, the bevelled edge 420 in turn engages the actuator 414, causing the actuator 414 to move, as follows. As can be seen in FIG. 21E, movement of the release plate 416 from an unreleased position (designated as "U" in FIG. 21E) to a released position (designated as "R" in FIG. 21E) causes the edge 420 to be pushed against the actuator 414. This in turn causes the actuator 414 to pivot about the actuator pin 422, resulting in the disengagement of the actuator 414 from the lock bar 406. In pivoting about the actuator pin 422, the actuator 414 moves from the engaged position (shown as "E" in FIG. 21F) to the disengaged position (shown as "D" in FIG. 21F).

The lock bar 406 is intended to be kept in the locked position during use. The unlocked position is only required when moving the bed, with or without the patient. If casters are not locked, problems can result when the patient is trying to enter or exit the bed with no assistance. The automatic activation of a locking mechanism helps solve the problem of accidentally leaving the bed in the unlocked position, where the patient may be vulnerable to unexpected movement of the bed. In practice, the bed is typically lowered to its lowest height for sleeping, or when no treatment is required.

It will be evident to those skilled in the art that the invention can take many forms, and that such forms are within the scope of the invention as claimed. Therefore, the spirit and scope of the appended claims should not be limited to the description of the preferred versions contained herein.

We claim:

1. An adjustable bed for use on a substantially planar floor, the adjustable bed including:
    a main bed frame having a first end and a second end;
    an adjustable bed carriage for supporting the main bed frame, the adjustable bed carriage having:
        at least one first leg having an upper end slidably attached to the first end of the main bed frame;
        at least one second leg having an upper end pivotably attached to the second end of the main bed frame;
        each of said at least one first leg and said at least one second leg being pivotably connected to each other at a central pivot located substantially at a midpoint of each said leg, to permit pivoting movement of each of said at least one first leg and at least one second leg about the central pivot in opposite directions to move the adjustable bed carriage between an extended condition and a retracted condition, moving the main bed frame relative to the plane of the floor;
    at least one motor mounted on the main bed frame and coupled to said at least one second leg; and
    said at least one motor being adapted to push the lower end of said at least one second leg away from the main bed frame and to pull the lower end of said at least one second leg toward the main bed frame.

2. A linkage assembly for supporting a main bed frame above a substantially planar floor, the linkage assembly having:
    at least one first leg having an upper end slidably attached to a first end of the main bed frame;
    at least one second leg having an upper end pivotably attached to the main bed frame;
    each of said at least one first leg and said at least one second leg being pivotably connected to each other at a central pivot located substantially at a midpoint of said at least one first leg, to permit pivoting movement of said at least one first leg and corresponding movement of said at least one second leg, to move the linkage assembly between an extended condition, in which the main bed frame is in a fully raised position, and a retracted condition, in which the main bed frame is in a fully lowered position;
    said at least one first leg including at least one caster base positioned distal to the first end of the main bed frame, said at least one caster base including at least one caster for engaging the floor;
    said at least one caster base being disposed in a preselected position relative to the plane of the floor when the linkage assembly is in the extended condition;
    at least one follower strut having an upper end and a lower end, the lower end being pivotably attached to said at least one caster base; and
    the upper end of said at least one follower strut being attached to said at least one second leg at a predetermined pivot point above the central pivot, the predetermined pivot point being selected such that said at least one follower strut maintains said at least one caster base substantially in the preselected position relative to the plane of the floor as the linkage assembly moves between the extended and the retracted conditions.

3. A linkage assembly according to claim 2 in which said at least one second leg includes at least one wheel mounted at a lower end of said at least one second leg disposed distal to the second end of the main frame, for engaging the floor.

4. A linkage assembly according to claim 2 in which said at least one caster base includes at least one locator element to which the lower end of said at least one follower strut is pivotably attached, said at least one locator element being positioned to locate the lower end of the follower strut such that said at least one caster base is maintained substantially in the preselected position relative to the plane of the floor as the linkage assembly moves between the extended condition and the retracted condition.

5. A linkage assembly according to claim 4 in which the main bed frame defines a footprint periphery beneath the main bed frame and said at least one caster base includes a caster base body portion and at least one mounting bracket adapted to receive said at least one caster, said at least one mounting bracket extending from the caster base body portion to locate said at least one caster such that at least a portion of said at least one caster is positionable proximate to the footprint periphery.

6. An adjustable bed for use on a substantially planar floor, the adjustable bed having:
    a main frame for supporting a mattress, the main frame having a first end and a second end;
    a scissor leg assembly for supporting the main frame;
    a motor mounted on the main frame and attached to the scissor leg assembly, for causing the scissor leg assembly to move between an extended condition, in which the main frame is in a fully raised position, and a retracted condition, in which the main frame is in a fully lowered position;
    the scissor leg assembly including:
        a first pair of legs having a proximal end slidably attached to the main frame at the first end and a second pair of legs having a proximal end pivotably attached to the main frame at the second end;
        the first pair of legs including at least one caster for engaging the floor and positioned in at least one caster base mounted at a distal end thereof positioned distal to the first end of the main frame;
        said at least one caster base being disposed in a preselected position relative to the plane of the floor when the scissor leg assembly is in the extended condition;
        the second pair of legs having at least one wheel for engaging the floor and mounted at a distal end thereof positioned distal to the second end of the main frame;
        the first and second pairs of legs being pivotably connected to each other at substantially coplanar central pivot points disposed substantially midway between the proximal ends and the distal ends of each said pairs of legs respectively, such that the scissor leg assembly is movable between the extended condition and the retracted condition;
        at least one follower strut having an upper end and a lower end, the lower end being pivotably attached to said at least one caster base;

the upper end of said at least one follower strut being pivotably attached to at least one of said legs in said second pair of legs at a predetermined pivot point located between said central pivot point and the proximal end of said second pair of legs; and said at least one predetermined pivot point being selected such that said at least one follower strut maintains said at least one caster base substantially in the preselected position relative to the plane of the floor as the scissor leg assembly moves between the extended condition and the retracted condition.

7. An adjustable bed according to claim 6 in which said at least one caster base includes:

at least one locator element to which the lower end of said at least one follower strut is pivotably attached, said at least one element being positioned relative to the predetermined pivot point location such that said at least one follower strut maintains said at least one caster base substantially in the preselected position relative to the plane of the floor as the main frame is moved between the fully raised and the fully lowered positions.

8. An adjustable bed according to claim 6 in which the main bed frame defines a footprint periphery beneath the main bed frame and said at least one caster base includes a caster base body portion and at least one mounting bracket adapted to receive said at least one caster, said at least one mounting bracket extending from said caster base body portion to locate said at least one caster such that at least a portion of said at least one caster is positionable proximate to the footprint periphery.

9. An adjustable bed according to claim 6 in which:

said at least one caster includes a caster housing pivotably attached to a caster stem and a caster wheel mounted in the caster housing for rotation about a caster wheel axis;

said at least one caster being operable between an unlocked condition, in which the caster wheel is rotatable about the caster wheel axis and the caster housing is pivotable about the caster stem, and a locked condition, in which a caster lock prevents rotation of the caster wheel and pivoting of the caster housing;

an actuator assembly for actuating the caster lock to the locked condition, the actuator assembly including:

a lock bar for activating the caster lock, the lock bar being movable between an activated position, in which the caster lock is activated, and a deactivated position, in which the caster lock is deactivated;

an actuator positioned on the main bed frame, for engaging the lock bar when the main bed frame is moved downwardly to an engagement position;

the actuator engaging the lock bar and urging the lock bar to the activated position, thereby activating the caster lock, when the main bed frame is moved downwardly to the engagement position.

10. An adjustable bed according to claim 9 in which the actuator assembly additionally includes a release element movable between an inactive position and a release position, the release element being operable to move the lock bar to the deactivated position when the release element is moved to the release position.

11. An adjustable bed according to claim 10 in which the actuator includes a tab adapted for engagement with the lock bar upon movement of the main bed frame downwardly to the engagement position, for activation of the lock bar.

12. An adjustable bed according to claim 10 in which the actuator assembly includes a release mechanism for releasing the tab from engagement with the lock bar for deactivation of the lock bar.

13. An adjustable bed according to claim 6 in which each of said legs in said first pair of legs and said second pair of legs is configured to provide a predetermined clearance between the adjustable bed and the floor when the main bed frame is in the fully lowered position.

14. A lock actuator assembly for activating and deactivating at least one caster lock included in at least one caster, said at least one caster being included in an adjustable bed carriage supporting a main bed frame, the lock actuator assembly having:

an activation assembly mounted on the adjustable bed carriage;

the activation assembly being adapted for activating said at least one caster lock; and an actuator mounted on the main bed frame, the main bed frame being movable by the adjustable bed carriage between a fully raised position, in which the adjustable bed carriage is in an extended condition, and a lowered position, in which the adjustable bed carriage is in a retracted condition, the actuator being positioned for activation of the activation assembly upon the main bed frame reaching an engagement position relative to the activation assembly as the main bed frame is lowered; and the actuator being adapted for de-actuating the activation assembly.

15. A lock actuator assembly according to claim 14 in which:

the activation assembly includes a lock bar for activating said at least one caster lock;

the lock bar being movable between an activated position, in which said at least one caster lock is activated, and a deactivated position, in which said at last one caster lock is deactivated;

the actuator being positioned on the main bed frame for engaging the lock bar when the main bed frame is lowered to the predetermined engagement position; and the actuator urging the lock bar to the activation position upon engagement therewith.

16. A lock actuator assembly according to claim 15 additionally including a release element movable between an inactive position, in which the release element is disengaged from the lock bar, and an active position, in which the release element urges the actuator out of engagement with the lock bar.

* * * * *